United States Patent
Kokubu et al.

(10) Patent No.: US 6,212,450 B1
(45) Date of Patent: *Apr. 3, 2001

(54) DATA CARRIER SYSTEM

(75) Inventors: Sadao Kokubu; Hisashi Aoki; Takashi Mizuno; Shinichi Koga, all of Aichi-ken (JP)

(73) Assignee: Kabushiki Kaisha Tokai-Rika-Denki-Seisakusho (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/331,082

(22) PCT Filed: Dec. 11, 1997

(86) PCT No.: PCT/JP97/04560

§ 371 Date: Jun. 14, 1999

§ 102(e) Date: Jun. 14, 1999

(87) PCT Pub. No.: WO98/26375

PCT Pub. Date: Jun. 18, 1998

(30) Foreign Application Priority Data

Dec. 12, 1996 (JP) .................................................... 8-332233

(51) Int. Cl.⁷ ............................ G01M 17/00; H01M 10/44
(52) U.S. Cl. ..................... 701/35; 340/425.5; 320/109; 320/106; 320/128; 307/10.7
(58) Field of Search ................... 701/35, 22; 340/425.5, 340/458; 307/9.1, 10.7, 48; 320/103, 104, 109, 106, 128

(56) References Cited

U.S. PATENT DOCUMENTS 5,739,674 * 4/1998 Kawahara et al. ..................... 320/48

FOREIGN PATENT DOCUMENTS

| 62-97197 | 5/1987 | (JP) . |
| 2-126255 | 10/1990 | (JP) . |
| 3-8095 | 1/1991 | (JP) . |

* cited by examiner

Primary Examiner—William A. Cuchlinski, Jr.
Assistant Examiner—Yonel Beaulieu
(74) Attorney, Agent, or Firm—Todd Deveau; Ryan A. Schneider; Troutman Sanders LLP

(57) ABSTRACT

When an engine is started with a key 19A inserted in an ignition key cylinder of a vehicle 11, a vehicle-side controller 12 transmits operational data to the key 19A and stores in the key 19A. Further, when a personal computer 30 is operated with the key 19A inserted in an R/W device 31, the R/W device 31 reads the operational data from the key 19A and transfers to the personal computer 30. In this structure, when a storage capacity of the key 19A becomes full, the vehicle-side controller 12 stores the operational data in a storage portion of its own, and when the key 19A is initialized, the stored operational data is written in the key 19A. For this reason, even when initialization of the key 19A is difficult, deletion of the operational data is prevented.

14 Claims, 28 Drawing Sheets

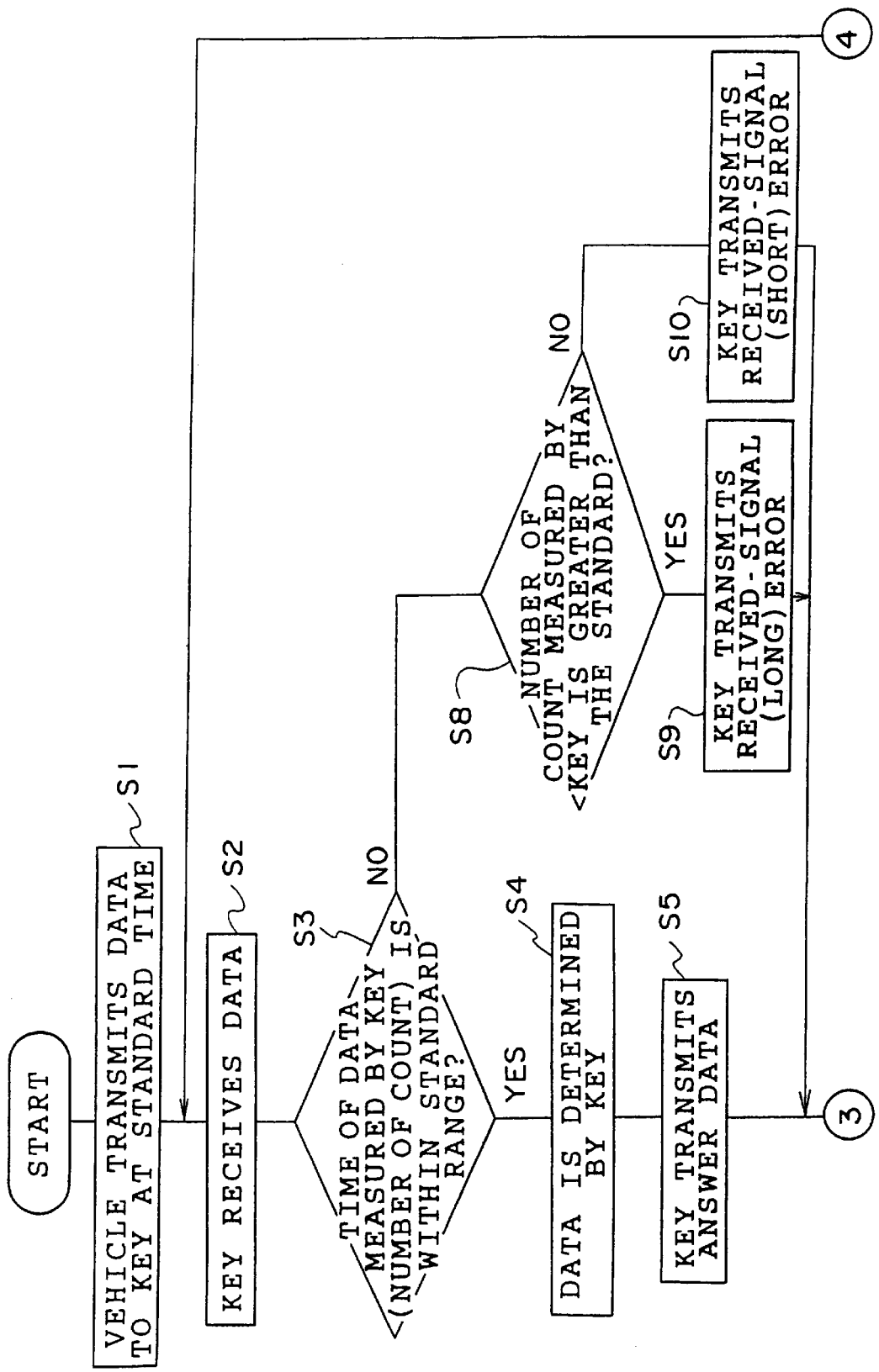

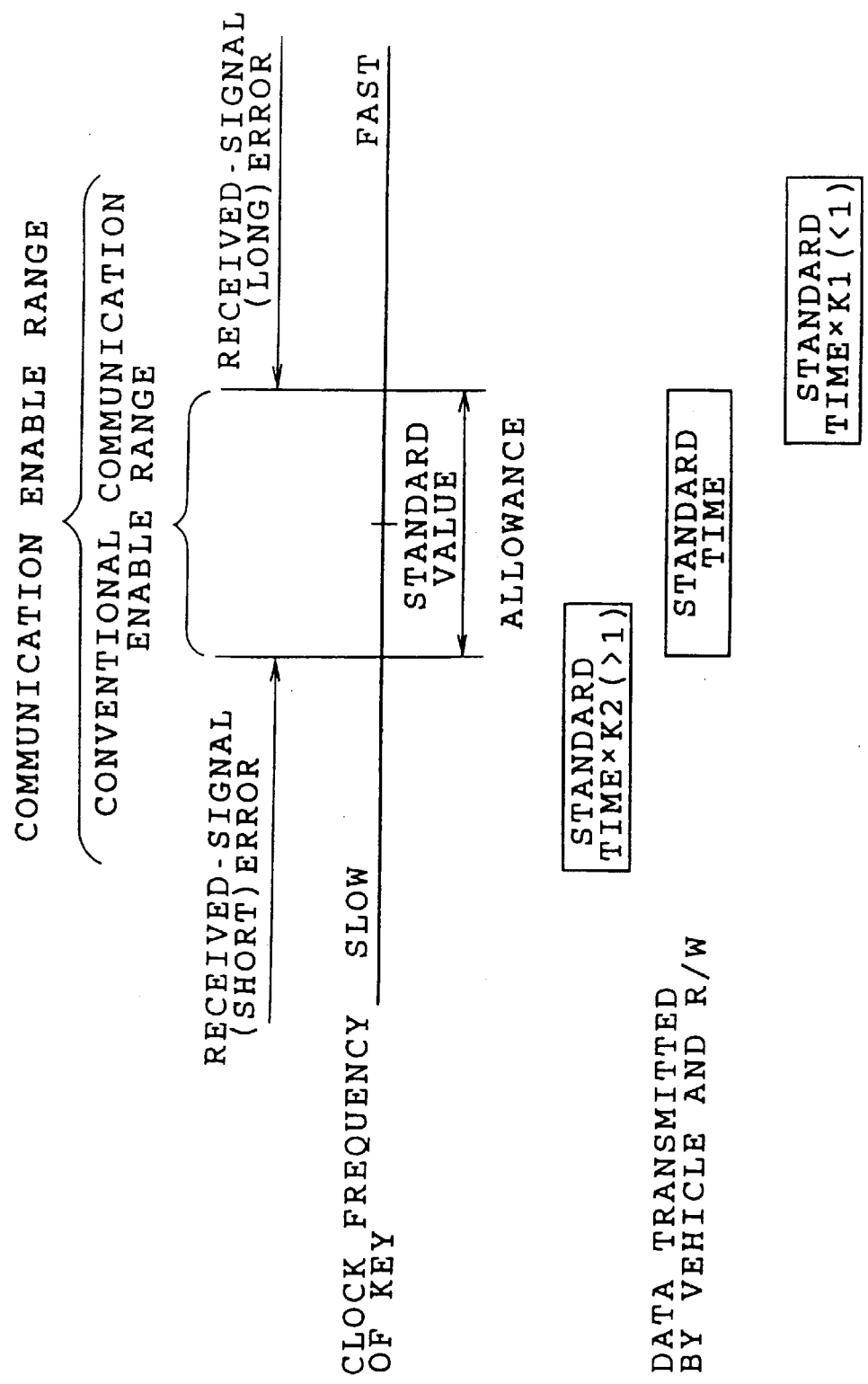

DATA CARRIER SYSTEM

FIELD OF THE INVENTION

The present invention relates to a data carrier system which carries out communication of operational data between a vehicle-side control device and a receiving device.

BACKGROUND ART

FIG. 27 shows a conventional structure of the above-described data carrier system. A vehicle 1 is equipped with a vehicle-side control device 2. When an IC card 3 is inserted in a holder of the vehicle 1 to allow start-up of an engine, the vehicle-side control device 2 transmits operational data (the date and time of start-up of the engine, and the like) of the vehicle 1 to the IC card 3 and the operational data is stored in the IC card 3. Further, a reading device 4 is installed in an office. When a personal computer 5 is operated with the IC card 3 being inserted in the reading device 4, the reading device 4 reads the operational data from the IC card 3 and transmits the same to the personal computer 5. As a result, the personal computer 5 displays the operational data on an image surface thereof or stores the same in a floppy disk.

In the above-described structure, when a storage capacity of the IC card 3 becomes full, the operational data cannot be recorded in the IC card 3. For this reason, when the personal computer 5 is operated, an initialization command is transmitted to the IC card 3 via the reading device 4 and the IC card 3 is provided to clear the operational data. However, initialization with the IC card 3 being carried in an office or the like may be a difficult operation depending on the existing state of things, or management of initialization wherein the IC card 3 is carried into an office or the like may be difficult. Accordingly, there is a possibility that the operational data may not be surely recorded.

The present invention has been devised in view of the above-described circumstances and an object thereof is to provide a data carrier system which can reliably record operational data.

DISCLOSURE OF THE INVENTION

A data carrier system described in claim 1 is characterized by comprising: a vehicle-side control device installed in a vehicle and transmitting operational data of the vehicle; and a receiving device for receiving operational data transmitted from the vehicle-side control device, wherein the receiving device includes a storage portion which stores received operational data, and said vehicle-side control device includes: a storage capacity detecting portion for detecting the storage capacity of said storage portion and an initialization detecting portion for detecting that said storage portion is initialized, and when the storage capacity of said storage portion is in a full state, the vehicle-side control device writes operational data in a storage portion of its own, and when said storage portion is initialized, the vehicle-side control device writes the operational data stored in the storage portion of its own in the storage portion of said receiving device.

According to the above-described means, when the storage capacity of the receiving device becomes full, the vehicle-side control device writes operational data in a storage portion of its own, and when the receiving device is initialized, the vehicle-side control device writes the stored operational data in the receiving device. For this reason, even when the storage capacity of the receiving device becomes full, the operational data is stored. Accordingly, even in the situation in which it is difficult to perform initialization of the receiving device carried into an office or the like, the operational data is reliably recorded.

A data carrier system described in claim 2 is characterized in that the vehicle-side control device includes a notifying portion which indicates that operational data is written in the storage portion of the vehicle-side control device.

According to the above-described means, the state in which operational data is written in the vehicle-side control device is notified. For this reason, the state in which the storage capacity of the receiving device is in a full state is indirectly notified, and therefore, a driver is required to perform initialization of the receiving device.

A data carrier system described in claim 3 is characterized in that the vehicle-side control device includes a notifying portion which indicates that the operational data stored in the storage portion of its own is being written in the storage portion of the receiving device.

According to the above-described means, the state in which the operational data stored in the vehicle-side control device is written in the receiving device is notified. For this reason, there is prevented such a situation that the communication between the vehicle-side control device and the receiving device is interrupted during writing of operational data and the writing of operational data is thereby impeded.

A data carrier system described in claim 4 is characterized by comprising: a vehicle-side control device installed in a vehicle and transmitting operational data of the vehicle; and a receiving device for receiving operational data transmitted from the vehicle-side control device, wherein the receiving device includes a storage portion which stores received operational data, and said vehicle-side control device includes: a remaining storage capacity detecting portion which detects the remaining storage capacity of said storage portion; and a notifying portion which indicates a result of detection of the remaining storage capacity.

According to the above-described means, the vehicle-side control device detects the remaining storage capacity of the receiving device and indicates the detection result. For this reason, it is possible for a driver to easily perform management in which the receiving device is initialized in a state of being carried into an office or the like, and therefore, the operational data is reliably recorded.

A data carrier system described in claim 5 is characterized in that when the result of detection of the remaining storage capacity is lower than a predetermined value, the vehicle-side control device indicates the result of detection. According to the above-described means, when the remaining storage capacity of the receiving device is lower than the predetermined value, the result of detection of the remaining storage capacity is notified. For this reason, there is prevented such a situation that the driver receives useless information in that the remaining storage capacity is large, so as to induce inadvertent attention.

A data carrier system described in claim 6 is characterized in that the notifying portion is comprised of a light source whose lighted state changes in accordance with the remaining storage capacity.

According to the above-described means, a lighted state of the light source changes in accordance with the remaining storage capacity of the receiving device, and therefore, the remaining storage capacity can be notified relatively roughly.

A data carrier system described in claim 7 is characterized in that the notifying portion is comprised of a display portion which displays the remaining storage capacity in a numeric or graphic display.

According to the above-described means, the remaining storage capacity of the receiving device is displayed in a numeric or a graphic manner, and therefore, the remaining storage capacity can be notified relatively exactly.

BRIEF DESCRIPTION OF THE DRAWINGS

FIGS. 2A and 2B are diagrams flow charts which show the contents of control made to correct a data length by a control circuit at the side of a vehicle, a control circuit at the side of an R/W device, and a control circuit at the side of a key.

FIG. 3 is a diagram which shows the relationship between a clock frequency of a transponder and a communication enable range.

EMBODIMENTS

Figure 1A:
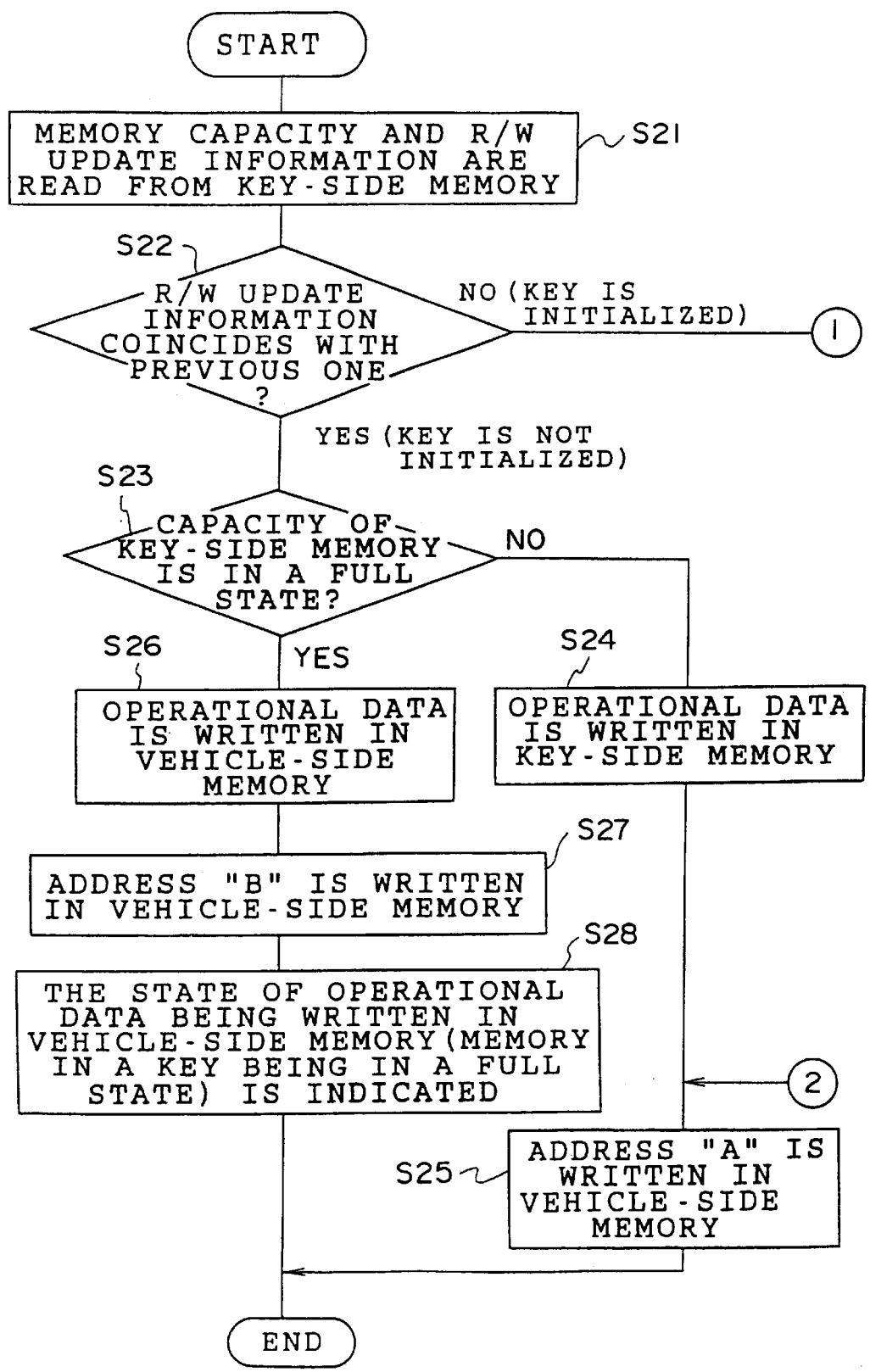
FIGS. 1A and 1B are of diagrams which shows a first embodiment of the present invention (a flow chart which shows the contents of control made to allow recording of operational data by a vehicle-side controller).

A first embodiment of the present invention will be hereinafter described with reference to FIGS. 1 to 25. First, in FIG. 5, a construction vehicle 11 is equipped with a vehicle-side controller 12 corresponding to a vehicle-side control device. As shown in FIG. 12, the vehicle-side controller 12 includes a control circuit 13 having as a main body a microcomputer, a power amplifier 14, a detection circuit 15, an amplifier 16, two antenna coils 17a (only one is shown in the drawing), and two resonant capacitors 17b (only one is shown in the drawing). One antenna coil 17a is provided in an ignition key cylinder (not shown) and the other antenna coil 17a is provided in a door key cylinder (not shown).

Reference numeral 17 designates a resonant circuit comprised of the antenna coils 17a and the resonant capacitors 17b. Further, the control circuit 13 corresponds to a storage capacity detecting portion, an initialization detecting portion, and a remaining storage capacity detecting portion.

Figure 13:
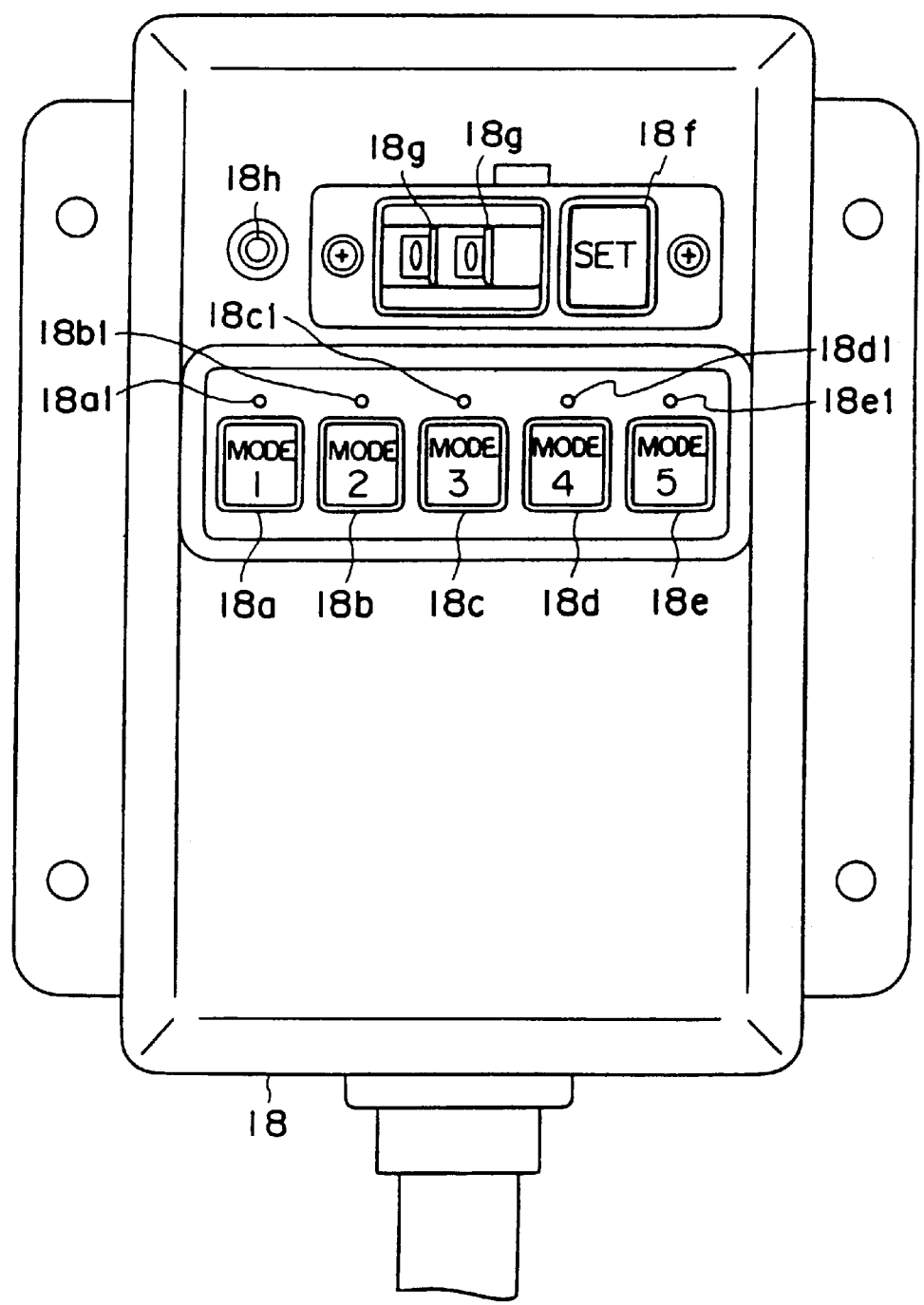
FIG. 13 is a diagram which shows an outside of the vehicle-side controller.

The control circuit 13, the power amplifier 14, the detection circuit 15, the amplifier 16, and the two resonant capacitors 17b are accommodated in a box 18 (see FIG. 13). As shown in FIG. 13, mounted on the front surface of the box 18 are mode switches 18a to 18e, a set switch 18f, two digit switches 18g, LEDs 18a1 to 18e1 corresponding to a notifying portion and a light source, and an LED 18h. The control circuit 13 effects setting of functions in accordance with the contents of operation of each of the switches 18a to 18g, as will be described later. The control circuit 13 lights or turns on and off the LEDs 18a1 to 18e1 and 18h, so as to indicate setting states of functions.

Meanwhile, a power circuit 13b and an input interface 13c are accommodated within the box 18 as shown in FIG. 12 and a power source is supplied from an on-vehicle battery 11c to the control circuit 13 via the power circuit 13b. Further, various on-vehicle sensors 11d (an alternator, a vehicle-speed sensor, a brake switch, and the like) are connected to the input interface 13c and the control circuit 13 reads information of the various sensors via the input interface 13c.

Figure 5:
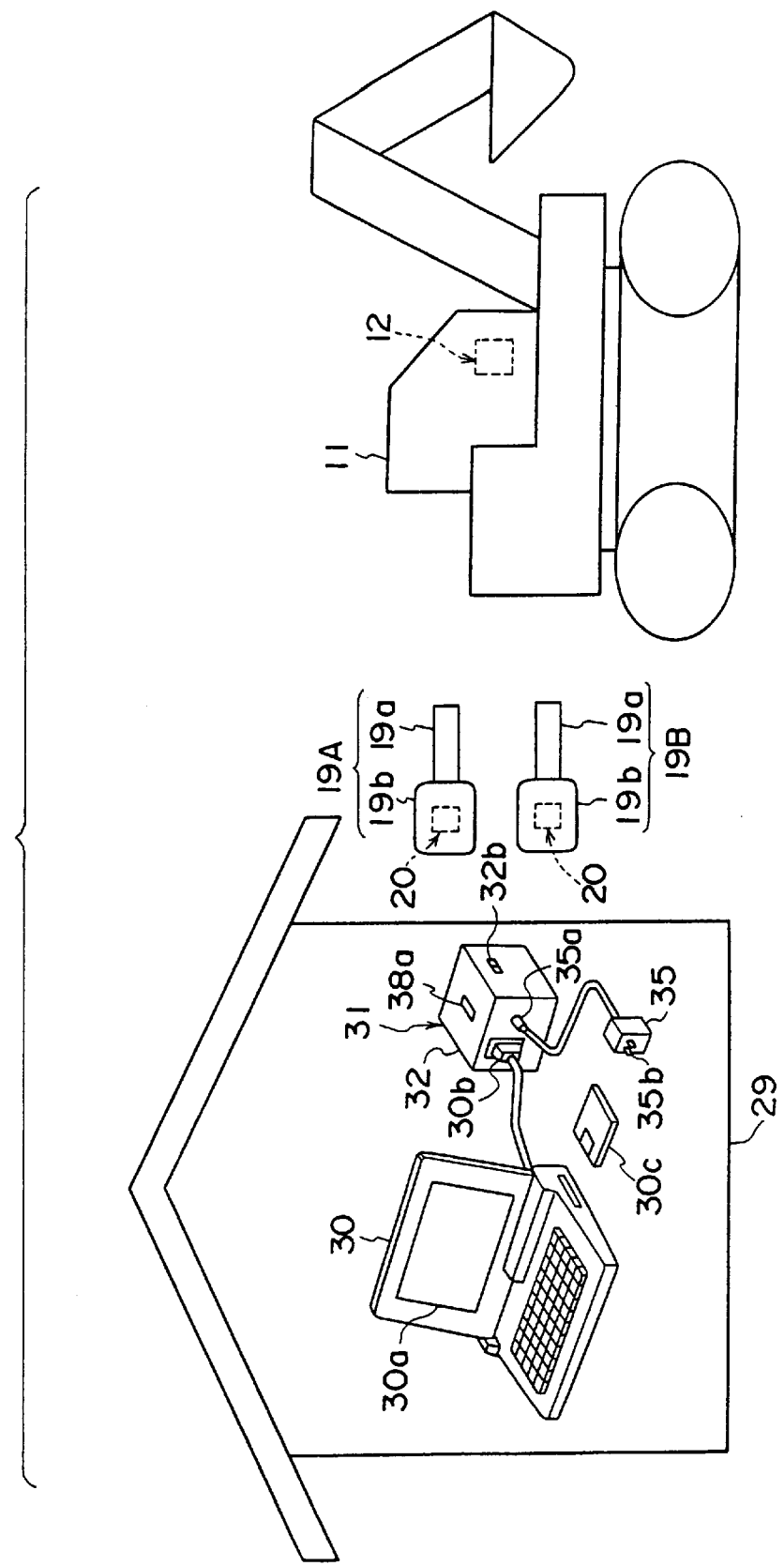
FIG. 5 is a diagram which schematically shows an overall structure.
Figure 10:
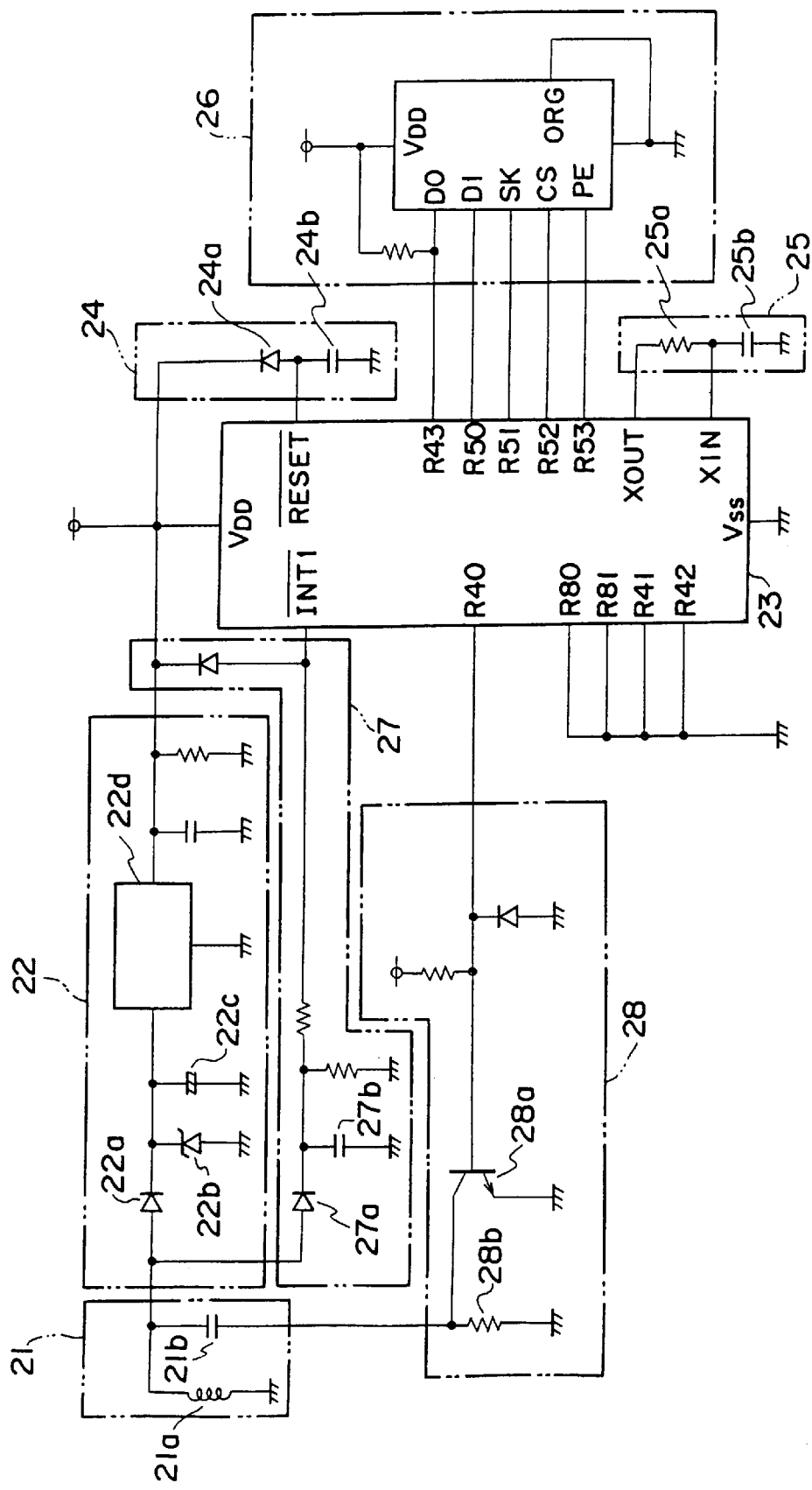
FIG. 10 is a diagram which shows an electrical structure of a transponder.

As shown in FIG. 5, a regular key 19A and a master key 19B are each formed of a main body portion 19a and a key grip 19b, and a transponder 20 is provided in each key grip 19b. Each transponder 20 corresponds to a receiving device. As shown in FIG. 10, the transponder 20 includes a resonant circuit 21, a power circuit 22, a control circuit 23, a reset circuit 24, a CR oscillation circuit 25, a nonvolatile memory 26 (corresponding to a storage portion) comprised of EEPROM, a detection circuit 27, and a modulation circuit 28.

Meanwhile, the regular key 19A is a key carried by a driver for the purpose of driving, and the master key 19B is a key exclusively used for registering an ID code and the like.

The resonant circuit 21 is comprised of an antenna coil 21a and a resonant capacitor 21b. When the main body portion 19a of the key 19A or 19B is inserted in the ignition key cylinder or in the door key cylinder, the antenna coil 17a at the side of the vehicle and the antenna coil 21a of the resonant circuit 21 are electromagnetically connected in a non-contacting state.

The vehicle-side control circuit 13 stores a control program, and accompanying an on/off operation of the power amplifier 14 based on the control program, the control circuit 13 transmits a power signal (a carrier signal shown in FIG. 14a), a level of which decreases with a predetermined timing, from each antenna coil 17a.

Accordingly, in a state in which the main body portion 19a of the key 19A or 19B is inserted in the ignition key cylinder or in the door key cylinder and the vehicle-side antenna coil 17a and the key-side antenna coil 21a are electromagnetically connected, the power signal transmitted from the vehicle-side antenna coil 17a is supplied to the key-side antenna coil 21a in a non-contacting state. Meanwhile, the resonance frequency of the resonant circuit 21 is set to be equal to a frequency band of the power signal transmitted from the side of the vehicle.

The power circuit 22 is comprised of a rectifying diode 22a, a diode 22b for a constant voltage, a smoothing capacitor 22c, a constant-voltage circuit 22d, and the like, and produces a direct-current power source by rectifying and smoothing the power signal received by the key-side antenna coil 21a. Further, the control circuit 23 is mainly comprised of a microcomputer. The direct current power source formed by the power circuit 22 is supplied to a power terminal VDD of the control circuit 23 and the control circuit 23 is driven by the direct-current power source from the power circuit 22.

The reset circuit 24 is comprised of a diode 24a and a capacitor 24b, and until the direct-current power source supplied to the power terminal VDD reaches a predetermined level, the control circuit 23 is held in a power-on reset state. Further, the CR oscillation circuit 25 is comprised of a resistance 25a and a capacitor 25b and determines a clock frequency of the control circuit 23.

Figure 11:
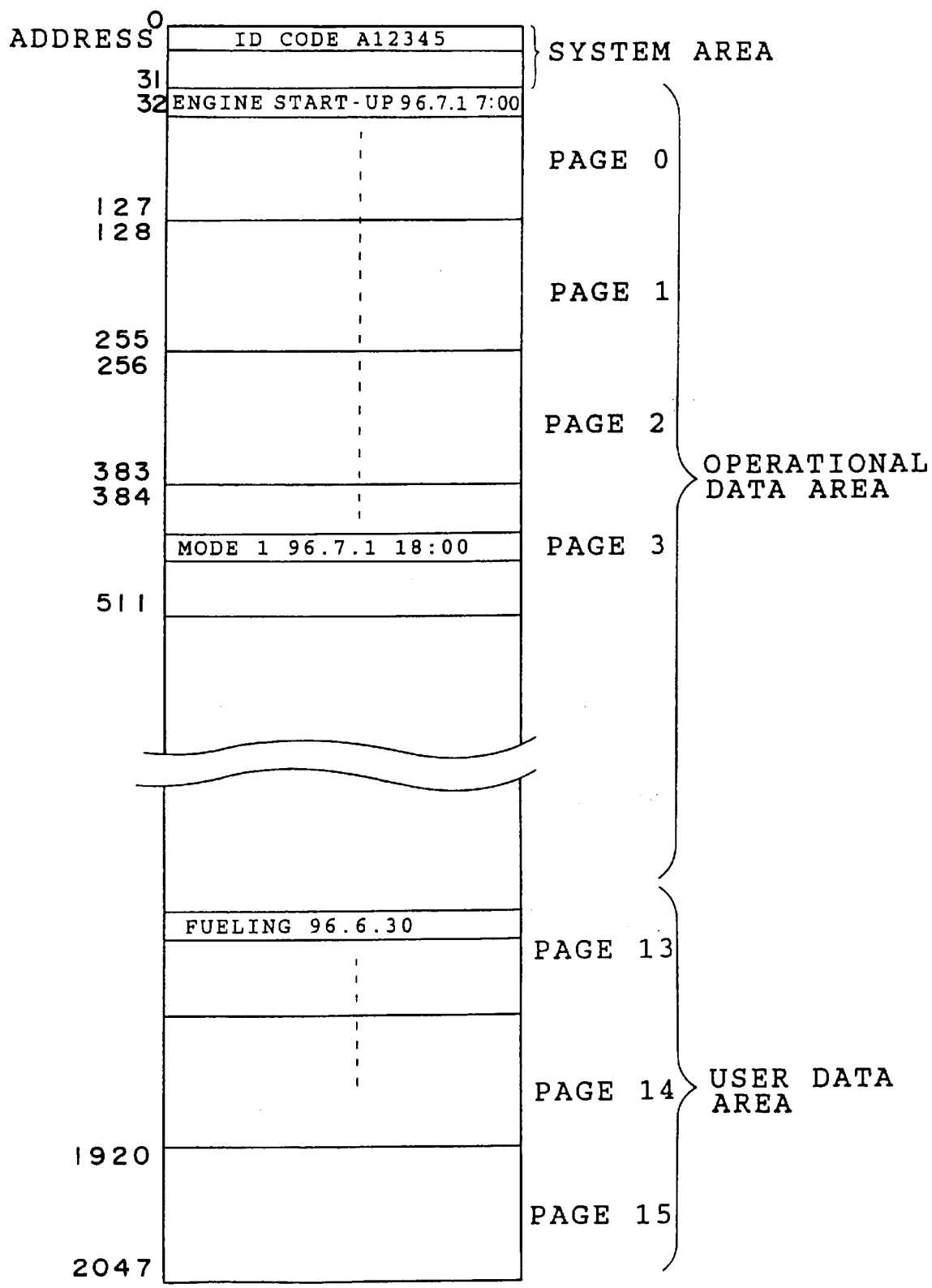
FIG. 11 is a diagram which shows data layout of a nonvolatile memory.
Figure 12:
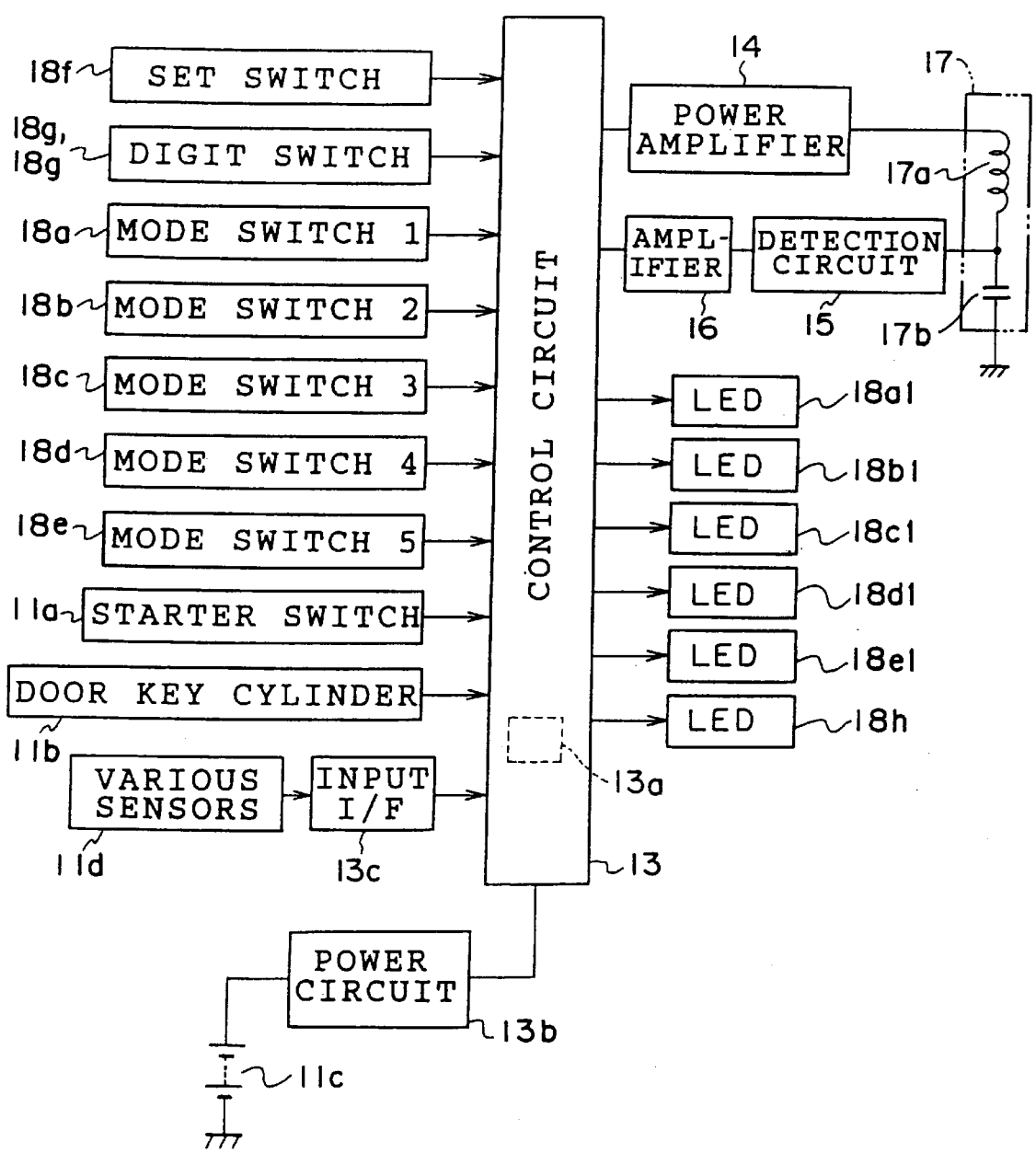
FIG. 12 is a diagram which shows an electrical structure of a vehicle-side controller.

Addresses 0 to 2047 (8-bit×2,048 addresses) of the nonvolatile memory 26 are, as shown in FIG. 11, divided into pages 0 to 15 (the numbers indicated at a left end side of the drawing are boundary addresses of pages 0 to 15). The pages 0 to 15 are divided into an operational data area in which operational data is written and a user data area in which user data such as optional carrying data is written. Addresses 0 to 31 of the operational data area are provided as a system area and an ID code is in advance recorded in the system area.

Meanwhile, the operational data and the user data each correspond to vehicle data. Further, the system area also stores, in addition to the ID code, the following key information (each key information will be described later): system code; password; setting information for an operational data area password; setting information for a user data area password; setting information for user data area write protect, area setting information, a recording start page; and an R/W update counter.

Figure 14A:
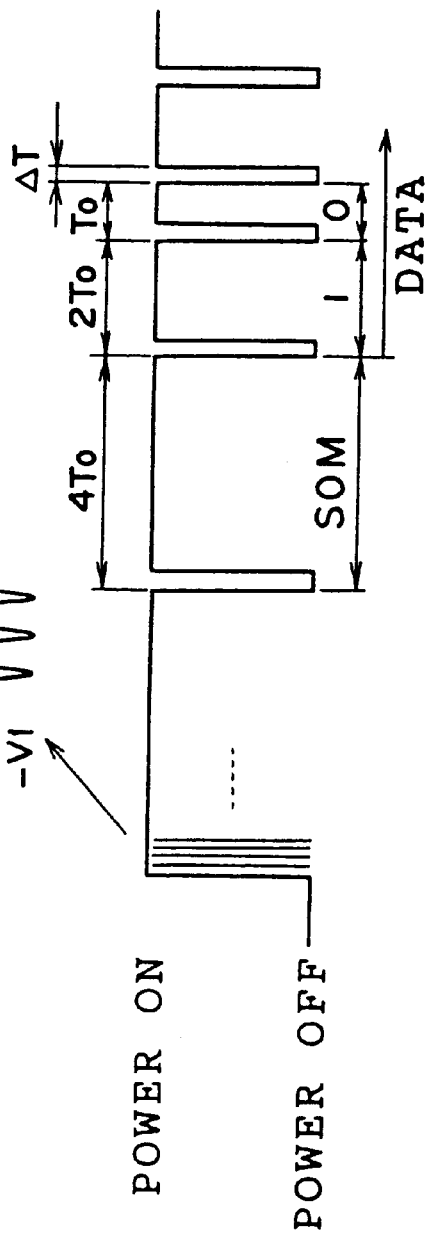
FIG. 14 is diagrams which each show a communication waveform of the vehicle-side controller, the key, and the R/W device.

The detection circuit 27 is, as shown in FIG. 10, comprised of a detecting diode 27a, a capacitor 27b, and the like. The detection circuit 27 shapes the power signal received by the key-side antenna coil 21a, and further, removes noise from the power signal and supplies it to the key-side control circuit 23. FIG. 14(a) shows the power signal to be supplied from the detection circuit 27 to the control circuit 23.

As shown in the same figure, the key-side control circuit 23 starts reading data based on detection of Start Of Message (=4To), and makes a determination about the contents of data transmitted from the vehicle-side control circuit 13 based on a combination of data 1 (=2To) and data 0 (=To).

Then, based on the result of this determination, the control circuit 23 reads the user data from the user data area of the nonvolatile memory 26 or writes operational data in the operational data area.

In this case, the key-side control circuit 23 performs addition for a counter based on a clock frequency of the CR oscillation circuit 25, and at the same time, measures a data transmitting time (data length) and discriminates SOM (Start Of Message), data 1, and data 0. The range T in which SOM can be discriminated is represented by "4To−1.2To<T<4To+1.2To" or thereabouts, the range T in which data 1 can be discriminated is represented by "2To−0.6To<T<2To+0.6To" or thereabouts, and the range T in which data 0 can be discriminated is represented by "To−0.3To<T<To+0.3To" or thereabouts (allowance is ±30% or thereabouts).

Meanwhile, a time constant of the detection circuit 27 allows shaping of the power signal, and therefore, it is set to be smaller than that of the power circuit 22. Further, in FIG. 14, Δ T corresponds to an off time of the power amplifier 14 controlled by the vehicle-side control circuit 13.

The modulation circuit 28 is, as shown in FIG. 10, comprised of a transistor 28a, a resistance 28b, and the like. The key-side control circuit 23 changes an impedance of the resonant circuit 21 by turning on or off the transistor 28a and responds to the contents of a command from the vehicle-side control circuit 13. As a result, synchronously with the change in the impedance of the resonant circuit 21, the amplitude of a response signal (a carrier signal shown in FIG. 14b) received by the vehicle-side antenna coil 17a changes.

Figure 14B:
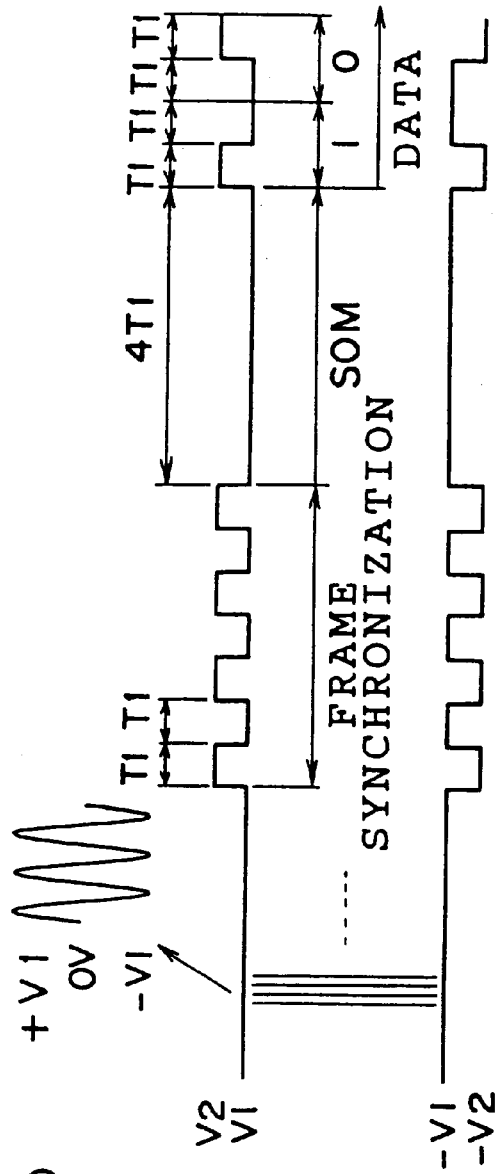

The detection circuit 15 at the side of the vehicle shapes the response signal received by the antenna coil 17a and supplies it to the control circuit 13 via the amplifier 16. FIG. 14(b) shows a response signal supplied to the control circuit 13. As shown in this drawing, when the control circuit 13 detects inputting of SOM after frame synchronization, the control circuit 13 starts reading data and makes a determination about the contents of a response from the key-side control circuit 23 based on the subsequent response signals.

Next, a preliminary operation for using the vehicle-side controller 12 will be described.

[Registration of key (when the master key 19B is used)]

The master key 19B is inserted in the ignition key cylinder. After 10 seconds or more have elapsed with a starter switch 11a (see FIG. 12) of the vehicle 11 set in an OFF state, the starter switch 11a is turned to ACC. As a result, the vehicle-side control circuit 13 switches the power amplifier 14 on or off, and at the same time, transmits a power signal which indicates "send an ID code" to the key-side control circuit 23.

When the key-side control circuit 23 receives the power signal, it is activated to determine the contents of a command of the power signal, and further reads out the ID code from a system area of the nonvolatile memory 26. Then, the control circuit 23 switches the transistor 28a of the modulation circuit 28 on or off, so as to transmit the ID code to the vehicle-side control circuit 13.

The vehicle-side control circuit 13 has a nonvolatile memory 13a (see FIG. 12) comprised of EEPROM and the nonvolatile memory 13a stores in advance an ID code of the master key 19B. When the control circuit 13 receives the ID code of the master key 19B from the key-side control circuit 23, the control circuit 13 reads out the ID code from the nonvolatile memory 13a and compares it with the ID code received from the side of the key. In this case, these ID codes coincide with each other, and therefore, the control circuit 13 switches the LED 18a1 on and off and indicates that the operation has proceeded to a key registration mode. The nonvolatile memory 13a corresponds to a storage portion.

When it is determined that the LED 18a1 has been switched on and off, the regular key 19A is inserted in the ignition key cylinder and turned to ACC within ten seconds after the starter switch 11a has been turned to OFF. As a result, the vehicle-side control circuit 13 reads out the ID code from the regular key 19A in the above-described procedure and writes the ID code in the nonvolatile memory 13a. Then, the control circuit 13 turns on the LED 18a1 for five seconds, so as to indicate the registration of the regular key 19A.

When the LED 18a1 is turned off, another regular key 19A is inserted in the ignition key cylinder and turned to ACC within ten seconds after the starter switch 11a has been turned to OFF. As a result, the vehicle-side control circuit 13 reads out an ID code from the regular key 19A in the above-described procedure and writes the ID code in the nonvolatile memory 13a. Then, the control circuit 13 turns on the LED 18a1 for five seconds, to thereby indicate registration of this regular key 19A.

When the above-described registration for all the regular keys 19A has been completed, the starter switch 11a is turned to START after it is confirmed that the LED 18a1 is turned off. As a result, the vehicle-side control circuit 13 recognizes that the registration of the keys has been completed, and turns on and off all the LEDs 18a1 to 18e1 and 18h a plurality of times (for example, twice) so as to indicate completion of the registration of the keys. Meanwhile, the maximum number of the regular keys 19A which can be registered is three, and two master keys 19B are provided.

[Registration of master code]

A master code is required when registration of a key is carried out without using the master key 19B, and is registered in the following procedure. After the regular key 19A is inserted in the ignition key cylinder and is turned to ACC, the mode switches 18a to 18e are selectively operated by pressing five times. Here, the vehicle-side control circuit 13 stores numerical values 1 to 5 correspondingly to the mode switches 18a to 18e, and sets the master code in accordance with which of the mode switches 18a to 18e have been operated. For example, when the mode switches 18e, 18d, 18c, 18b, and 18a are operated sequentially, the master code is set at "54321".

After the mode switches 18a to 18e have been selectively operated five times, the set switch 18f is continuously pressed for four seconds or more. As a result, the vehicle-side control circuit 13 makes a determination that inputting of the master code has been completed, and registers the master code at "54321". Then, the control circuit 13 turns the LED 18h on and off a plurality of times (for example, five times) to thereby indicate that the registration of the master code has been completed.

[Registration of key (when the master key 19B is not used)]

After the regular key 19A is inserted in the ignition key cylinder and ten seconds or more have elapsed with the starter switch 11a being set in an OFF state, the regular key is turned to ACC and the master code is inputted. Inputting of the master code is carried out in the same procedure as explained in the section, "registration of a master code".

As a result, the vehicle-side control circuit 13 turns the LED 18a1 on and off and indicates that the process has proceeded to a key registration mode. Then, the ID code is read out from the regular key 19A in the above-described procedure and is written in the nonvolatile memory so as to be registered. Meanwhile, registration of the second and subsequent keys is carried out in the same way as in the case of using the master key 19B.

[Registration of secret identification code]

A secret identification code is required when a system is stopped due to reasons of loss or failure of a registered key, or other reasons. The secret identification code is registered in the following procedure. Meanwhile, stoppage of the system will be described later.

The regular key 19A or the master key 19B is inserted in the ignition key cylinder, and an operation set including the following operations (1) and (2) is carried out four times (sets).

(1) the key 19A or 19B is turned in the order of (OFF) →ACC→OFF, only N times (N is an integer of 1 to 9); and (2) the key 19A or 19B is turned in the order of (OFF) →HEAT→OFF, only once.

For example, when N=1 in a first set, N=2 in a second set, N=3 in a third set, and N=4 in a fourth set, the vehicle-side control circuit 13 confirms that the secret identification code is "1234".

After the secret identification code is inputted, the key 19A or 19B is held at the position of HEAT for four seconds or more. As a result, the vehicle-side control circuit 13 ends the registration of the secret identification code "1234" and turns the LED 18h on and off a plurality of times (for example, five times), so as to indicate that the registration of the secret identification code has been completed.

[Setting of internal clock]

An internal clock becomes a reference for detection of operational data such as the date and time of a start-up of an engine and is set in the following procedure.

After the starter switch 11a has been turned to ACC by the regular key 19A, the set switch 18f is continuously pressed for four seconds or more. As a result, the vehicle-side control circuit 13 turns the LEDs 18a1 to 18e1 and 18h on and off a plurality of times (for example, three times), and thereafter, the control circuit 13 stops an on-and-off state of the LED 18h and holds only the LEDs 18a1 to 18e1 in an on-and-off state, and indicates that the operation has proceeded to a clock setting mode.

When the set switch 18f is operated, an operation set including an operation of the digit switches 18g and an operation of the set switch 18f is effected five times (sets), and simultaneously, the year, month, date, time, and minute are sequentially inputted. As a result, the vehicle-side control circuit 13 sets, based on an output signal from the digit switches 18g, the year, month, date, time, and minute of the internal clock. At the same time, the LEDs 18a1 to 18e1 are sequentially turned off each time setting of the year, month, date, time, and minute is completed. Then, the control circuit 13 turns the LEDs 18a1 to 18e1 and 18f on and off a plurality of times (for example, twice) to thereby indicates completion of setting the internal clock.

Meanwhile, in performing "registration of master code", "registration of secret identification code", and "setting of internal clock", when the starter switch 11a is turned to ACC, the vehicle-side control circuit 13 transmits to the key-side control circuit 23 a power signal which commands to "send an ID code". As a result, the key-side control circuit 23 reads out the ID code from the system area of the nonvolatile memory 26 and transmits the ID code to the vehicle-side control circuit 13.

When the vehicle-side control circuit 13 receives the ID code, it reads out the registered ID code from the nonvolatile memory 13a and compares the same with an ID code from the key side. Here, only when the ID code from the key side exists among the read ID codes, are "registration of master code", "registration of secret identification code", and "setting of internal clock" allowed.

[Assignment of operation mode to mode switches]

The mode switches 18a to 18e are used to allow the vehicle-side control circuit 13 to recognize which operation is being effected at present (for example, when operation of mode 1 is effected, the mode switch 18a is operated, reporting to the control circuit 13 that the operation of a mode 1 is being effected). It is preferable that an assigned operation mode be clearly shown in the vicinity of the mode switches 18a to 18e so as to prevent malfunction of the mode switches 18a to 18e.

Next, functions of the vehicle-side controller 12 will be described.

[Door security function]

After the regular key 19A has been inserted in the door key cylinder and turned to the right side (i.e., the side of locking) or to the left side (i.e., the side of lock release), the regular key 19A is turned back to an original position. As a result, the vehicle-side control circuit 13 transmits a power signal which indicates, "transmit ID code", to the key-side control circuit 23 and it is determined by the control circuit 13 whether the ID code received from the key-side control circuit 23 has been registered. For example, when the ID code from the key side has been registered, a lever disposed at a back side of the door key cylinder and a door locking mechanism are linked together so that a door is brought into an unlockable state. Accordingly, in this state, when the regular key 19A is turned to the left side (i.e., the side of lock release), the door is unlocked.

Further, when the ID code from the key side is not registered, the vehicle-side control circuit 13 records in the nonvolatile memory 13a the fact that there is abnormality in the security aspect. At the same time, the control circuit 13 effects an operation for causing a horn (not shown) of the vehicle 11 to make a sound for a predetermined time (for example, 30 seconds) and an operation for turning on and off a light (not shown) of the vehicle 11 for a predetermined time (for example, 4 minutes), to thereby indicate that there was abnormality in the security aspect. Meanwhile, in FIG. 12, reference numeral 11b designates a door switch, which is turned on together with rotation of the door key cylinder. The vehicle-side control circuit 13 detects, based on an on signal from the door switch 11b, that the regular key 19A has been turned.

[Immobilizer function]

The regular key 19A is inserted in the ignition key cylinder and is turned to ACC or to HEAT. As a result, the vehicle-side control circuit 13 transmits to the key-side control circuit 23 a power signal which indicates, "transmit ID code", and it is determined by the control circuit 13 whether the ID code received from the key-side control circuit 23 has been registered.

For example, when the ID code from the key side has been registered, the vehicle-side control circuit 13 turns on a main power source of the vehicle 11 to allow the start-up of the engine. Further, when the ID code from the key side has not been registered, the vehicle-side control circuit 13 records in the nonvolatile memory 13a the fact that there was abnormality in the security aspect. At the same time, the control circuit 13 effects the operation for causing the horn to make a sound and the operation for turning the light on and off, to thereby indicate that there was abnormality in the security aspect.

Meanwhile, when the vehicle-side control circuit 13 detects any one of the following operations (1) and (2), the control circuit 13 stops causing the horn to make a sound and turning the light on and off.

(1) The registered regular key 19A or the registered master key 19B is used to turn the starter switch 11a to HEAT or to ACC.

(2) The registered regular key 19A or the registered master key 19B is used to turn the door switch 11b (to either of the right and left sides).

[Operational data recording function]

When the engine is started, the vehicle-side control circuit 13 transmits, to the key-side control circuit 23, a power signal which indicates, "record operational data", and a power signal which indicates the "date and time of the start-up of the engine". As a result, the key-side control circuit 23 writes the date and time of the start-up of the engine in the operational data area of the nonvolatile memory 26. In this case, the system area is provided in a beginning portion of the operational data area, and therefore, writing of the operational data is executed with the 32-th address of page 0 set as a top address.

When the engine is started, the vehicle-side control circuit 13 measures on-time T1 to T5 of the mode switches 18a to 18e and an off-time T0 in which none of the mode switches 18a to 18e is turned on.

For example, when the mode switch 18a corresponding to the mode 1 is operated, the vehicle-side control circuit 13 performs addition for an operating time counter 1, so as to measure the operating time T1 of the mode 1. In this state, when the mode switch 18b corresponding to an operation mode 2 is operated, the control circuit 13 performs addition for an operating time counter 2, so as to measure the operating time T2 of the operation mode 2. When the vehicle-side control circuit 13 measures the on-time T1 to T5 and the off-time T0, it transmits the operation mode to the key-side control circuit 23 at six-minute intervals and records the operation mode (see FIG. 17) for each unit of time. The operation mode having the longest operating time during the interval of six minutes is transmitted. For example, when the on-time of the mode switch 18a is one minute, the on-time of the mode switch 18b is two minutes, and the on-time of the mode switch 18c is three minutes, the control circuit 13 transmits that the operation mode of six minutes is "mode 3" corresponding to the mode switch 18c. Meanwhile, when the off-time T0 is the longest, "mode 0" is transmitted.

Figure 1B:
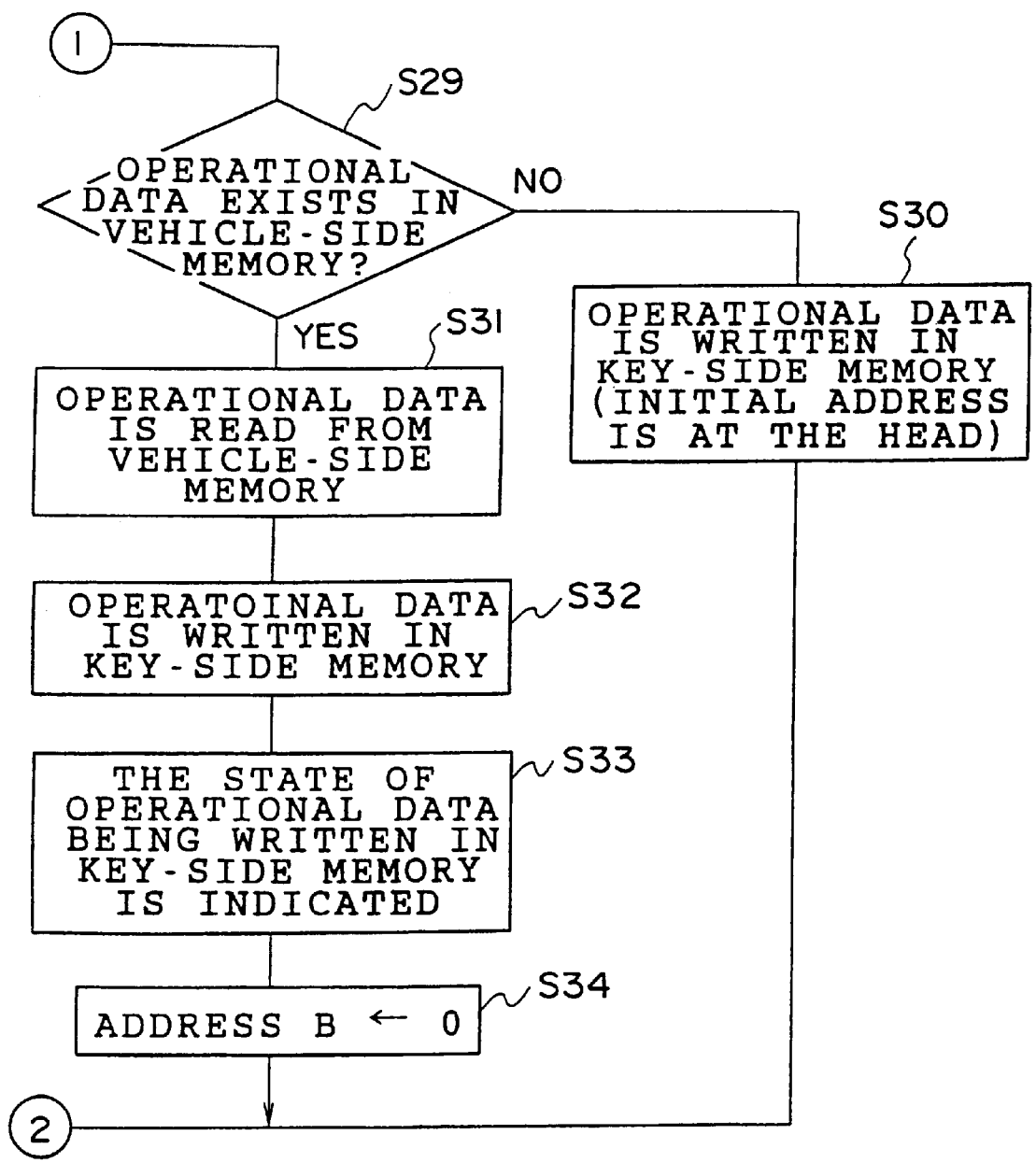

FIG. 1 is a flow chart which shows the contents of control performed by the vehicle-side control circuit 13 to record operational data. Here, when the engine is started, the process proceeds to step S21 and the vehicle-side control circuit 13 reads, from the key-side control circuit 23, the storage capacity of the nonvolatile memory 26 (the storage capacity of an operational data area) and a value of an R/W update counter.

The R/W update counter performs addition by one ("1") each time the operational data area of the nonvolatile memory 26 is initialized (see "reading function of key information"). When the vehicle-side control circuit 13 reads the value of the R/W update counter, the process proceeds to step S22, in which it is determined whether the value of the R/W update counter coincides with a value read at a previous time. For example, when a present value and a previous value of the R/W update counter coincide with each other, it is determined that the operational data area has not been initialized, and the process proceeds from step S22 to step S23.

The vehicle-side control circuit 13 records a writing start address A of operational data for the key-side nonvolatile memory 26 in a memory (RAM) of its own (step S25). When the process proceeds to step S23, it is determined whether, based on the storage capacity of the operational data area detected in step S21 and the address A, "the storage capacity of the key-side nonvolatile memory 26 (the storage capacity of the operational data area) is in a full state".

For example, when the storage capacity of the operational data area is not in a full state, the process proceeds from step S23 to step S24 and the vehicle-side control circuit 13 writes operational data in the operational data area with the writing start address A is set at the head. Then, the process proceeds to step S25, in which the vehicle-side control circuit 13 updates the writing start address A and writes in the memory (RAM) of its own.

Further, when in step S23 it is determined that "the storage capacity of the key-side nonvolatile memory 26 (the storage capacity of the operational data area) is in a full state", the process proceeds from step S23 to step S26 in which the vehicle-side control circuit 13 writes the operational data in the nonvolatile memory 13a of its own, and the process proceeds to step S27.

Meanwhile, the operational data area is provided in the vehicle-side nonvolatile memory 13a and the vehicle-side control circuit 13 writes operational data in the operational data area. Further, the vehicle-side control circuit 13 records, in the memory (RAM) of its own, a writing start address B of operational data for the operational data area of its own (step S27). When the process proceeds to step S26, the control circuit 13 writes operational data with the address B set at the head.

When the process proceeds to step S27, the vehicle-side control circuit 13 updates a writing start address B at the side of the vehicle and writes the same in the memory (RAM) of its own. Then, the process proceeds to step S28 and the control circuit 13 turns on and off the LED 18a1, so as to indicate that operational data is recorded in the vehicle-side nonvolatile memory 13a (i.e., the storage capacity of the operational data area at the key side is in a full state).

Further, when in step S22 the vehicle-side control circuit 13 detects that "the present value and the previous value of the R/W update counter do not coincide with each other", it is determined that the key-side operational data area has been initialized, and therefore, the process proceeds from step S22 to step S29. Then, it is determined by the vehicle-side control circuit 13 whether the operational data has been written in the nonvolatile memory 13a owned by the control circuit 13.

For example, when the operational data has not been written in the nonvolatile memory 13a, the process proceeds from step S29 to step S30 and the operational data is written in the key-side nonvolatile memory 26 with an initial address set at the head. Then, the process proceeds to step S25 and the control circuit 13 updates the writing start address A at the key side and records in the memory (RAM) of its own.

Further, when in step S29 it is determined by the vehicle-side control circuit 13 that "the operational data is written in the nonvolatile memory 13a owned by the control circuit 13", the process proceeds from step S29 to step S31 in which operational data is read from the nonvolatile memory 13a. Then, the process proceeds to step S32 in which the operational data is written in the key-side nonvolatile memory 26 with the initial address set at the head, and thereafter, the process proceeds to step S33.

When the process proceeds to step S33, the vehicle-side control circuit 13 turns on and off the LED 18b1, so as to indicate that the operational data stored in the nonvolatile memory 13a owned by the control circuit 13 is written in the key-side nonvolatile memory 26. Then, the process proceeds to step S34 in which a writing start address B at the side of the vehicle is rewritten to "0", and thereafter, the process proceeds to step S25 in which the vehicle-side control circuit 13 records the key-side writing start address A in the memory (RAM) of its own.

[Past history function of security]

The vehicle-side control circuit 13 records, as described above, a past history in terms of the security aspect during stoppage of the engine. When the engine is started, the control circuit 13 reads out the past history in terms of the security aspect from the nonvolatile memory 13a and transmits a command signal, "record data", and "past history of security" data. As a result, the key-side control circuit 23 writes the "past history in terms of the security aspect" in the operational data area of the nonvolatile memory 26. Meanwhile, the past history data of security corresponds to a portion of operational data and is processed in accordance with the flow chart shown in FIG. 1.

[System stopping function]

The regular key 19A or the master key 19B (an unregistered key may also be used) is inserted in the starter switch 11a and the operation described in the section of "registration of secret identification code" is effected, and at the same time, the secret identification code is inputted. As a result, the vehicle-side control circuit 13 stops "operational data recording function", "immobilizer function", and "door security function" and turns the LED 18h on and off a plurality of times (for example, five times), and at the same time, the control circuit 13 indicates that the system is down.

Meanwhile, the stoppage of the system is also performed by inserting the regular key 19A or the master key 19B (which may also be an unregistered key) in the door key cylinder and by inputting the secret identification code. In this case, inputting of the secret identification code is executed by turning the key 19A or 19B in the order, of (OFF)→the right side (the side of locking) →OFF. Further, determination of the inputting is made in the order of, (OFF)→the left side (the side of lock release)→OFF.

[Set-up of system]

When the regular key 19A or the master key 19B (which may also be an unregistered key) is inserted in the starter switch 11a in a system-down state and the operation described in the section of "registration of secret identification code" is effected, at the same time, a secret identification code is inputted. As a result, the vehicle-side control circuit 13 performs set-up of the system.

In the above-described structure, the voltage of the key-side control circuit 23 varies under the influence of environmental temperature or the like by the reason that operating power is supplied from the vehicle-side control circuit 13 to the key-side control circuit 23 in a non-contacting state. As a result, the clock frequency of the key-side control circuit 23 varies, and therefore, there is a possibility that data communication between the vehicle-side control circuit 13 and the key-side control circuit 23 cannot be accurately performed. Accordingly, when each of the above-described operations is performed, the length of data is corrected in such a manner as described below. When the engine is started, the process proceeds to step S1 in FIG. 2 and the vehicle-side control circuit 13 transmits data (a command signal or the like) to the key-side control circuit 23 at the standard time.

The key-side control circuit 23 performs addition for a counter based on the clock frequency thereof, and at the same time, measures a data receiving time (data length) and discriminates SOM, data 1 and data 0. When the key-side control circuit 23 receives data in step S2, the process proceeds to step S3 in which it is determined whether the value of the counter is within a standard range (the above-described range of allowance ±30%). For example, when the value of the counter is within the standard range, the process proceeds from step S3 to step S4 and the contents of data are determined. Then, the process proceeds from step S4 to step S5, and based on the result of this determination, the key-side control circuit 28 turns on or off the transistor 28a of the modulation circuit 28, and at the same time, transmits a response signal to the vehicle-side control circuit 13.

When in step S6 the vehicle-side control circuit 13 receives the response signal from the key-side control circuit 23, the vehicle-side control circuit 13 obtains a central value by averaging frame synchronization, and thereafter, based on the central value, a shear rate of the clock frequency of the key-side control circuit 23 is estimated. Then, the process proceeds from step S6 to step S7 and the contents of the received signal is determined while considering the shear rate of the clock frequency. Here, the received signal is normal data (a response to data transmitted to the key-side control circuit 23), and therefore, a predetermined processing operation is performed based on the normal data (end).

When in step S3 it is determined by the key-side control circuit 23 that the value of the counter is not within the standard range, it is determined that the clock frequency varies. The process proceeds from step S3 to step S8 and it is determined whether the value of the counter is greater than the standard.

For example, when the value of the counter is greater than the standard (when the clock frequency of the key-side control circuit 23 is higher than the standard), the process proceeds from step S8 to step S9 and the key-side control circuit 23 turns on or off the transistor 28a of the modulation circuit 28, and at the same time, transmits a "receiving-time (long) error signal" to the vehicle-side control circuit 13. Further, when the value of the counter is less than the standard (when the clock frequency of the key-side control circuit 23 is lower than the standard), the process proceeds from step S8 to step S10. The key-side control circuit 23 turns on or off the transistor 28a of the modulation circuit 28, and at the same time, transmits the "receiving-time (short) error signal" to the vehicle-side control circuit 13.

When the vehicle-side control circuit 13 receives the response signal from the key-side control circuit 23 in step S6, the vehicle-side control circuit 13 obtains a central value by averaging frame synchronization, and thereafter, based on the central value, the control circuit 13 estimates a shear rate of the clock frequency of the key-side control circuit 23. Then, the process proceeds from step S6 to step S7 and the contents of the received signal is determined while considering the shear rate of the clock frequency. Here, since the received data is not normal data, the process proceeds from step S7 to step S11.

When the process proceeds to step S11, it is determined by the vehicle-side control circuit 13 whether the received signal is the "receiving-time (long) error signal". For example, when the received signal is the "receiving-time (long) error signal", the process proceeds from step S11 to step S12 and the control circuit 13 retransmits previous data to the key-side control circuit 23 at the standard time×K1 (<1). Further, when the received signal is not the "receiving-time (long) error time" (when the received signal is the "receiving-time (short) error time"), the process proceeds to step S13 and the control circuit 13 retransmits previous data to the key-side control circuit 23 at the standard time×K2 (<1).

When data is retransmitted from the vehicle-side control circuit 13 to the key-side control circuit 23, the above-described series of operations are repeated until the data receiving time of the key-side control circuit 23 reaches the standard range. When the data receiving time of the key-side control circuit 23 reaches the standard range, normal data is transmitted from the key-side control circuit 23 to the vehicle-side control circuit 13, and therefore, the vehicle-side control circuit 23 performs the predetermined processing operation based on the normal data.

As shown in FIG. 5, a desktop personal computer 30 (hereinafter referred to as a personal computer 30) corresponding to an external controller is installed in an office 29. Connected to the personal computer 30 is a read/write device 31 (hereinafter referred to as an R/W device 31) corresponding to a reading device. The R/W device 31 will be hereinafter described in detail.

Figure 6:
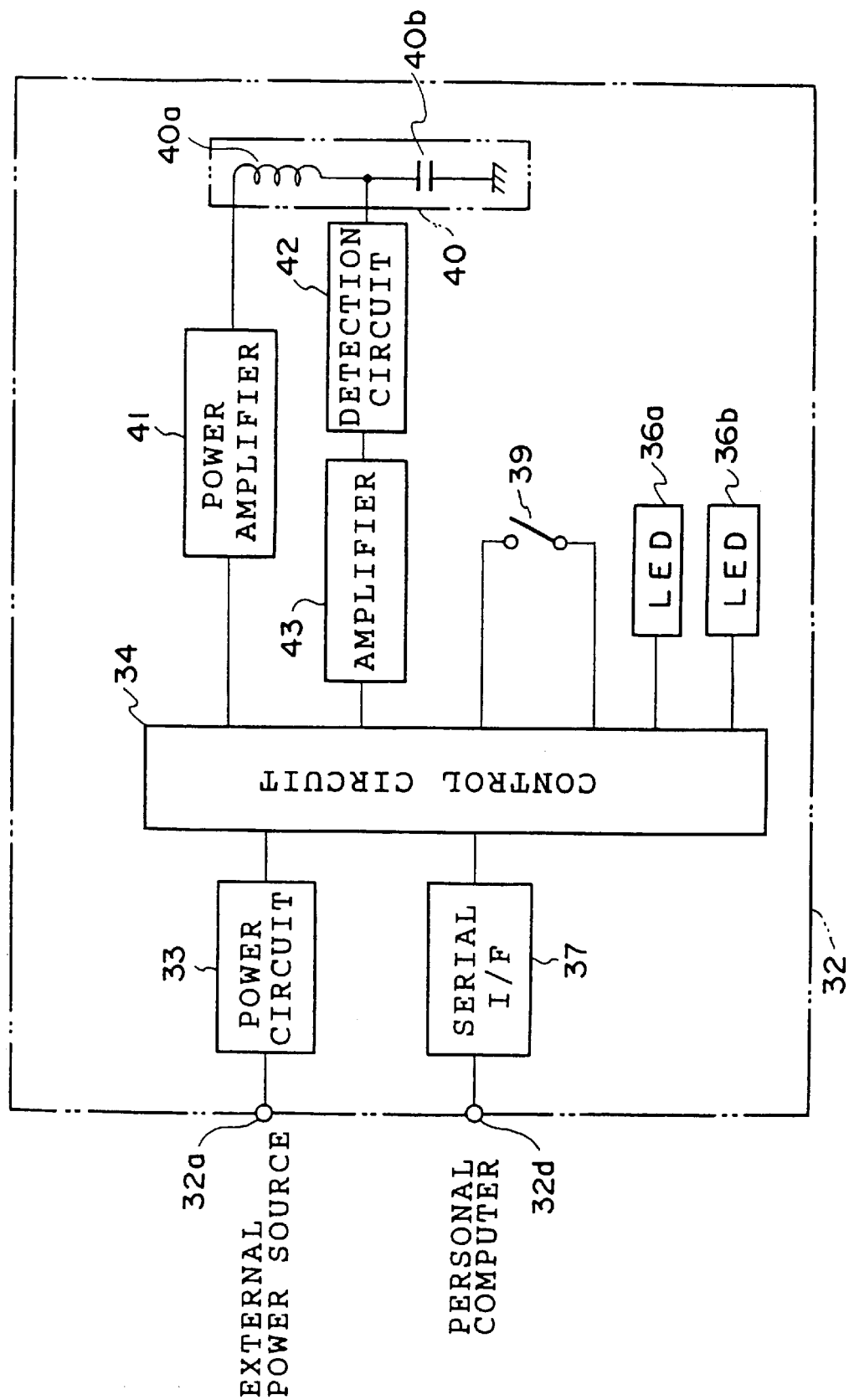
FIG. 6 is a diagram which shows an electrical structure of an R/W device.

As shown in FIG. 6, a box 32 includes a power circuit 33 and a control circuit 34 mainly comprised of a microcomputer. A jack 32a (see FIG. 9) and a power switch 32b (see FIG. 7) are mounted to the box 32. As shown in FIG. 5, after a plug 35a of an AC adapter 35 is inserted in the jack 32a and a receptacle 35b of the AC adapter 35 is inserted in a commercial AC power source (not shown), when the power switch 32b is turned on, a power source is supplied to the control circuit 34 via the power circuit 33 and the control circuit 34 is thereby driven.

Figure 8:
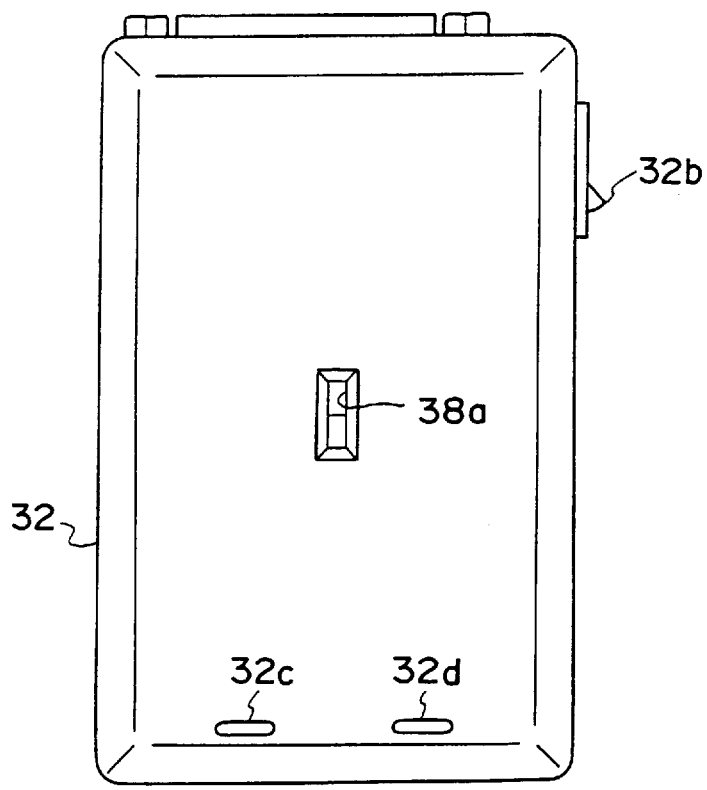
FIG. 8 is a top view which shows the R/W device.

A green indicator lens 32c is, as shown in FIG. 8, mounted to the box 32. As shown in FIG. 6, an LED 36a is provided within the box 32. When the power switch 32b is turned on, the control circuit 34 supplies a power source to the LED 36a. As a result, the indicator lens 32c is lighted to indicate that the power source is on.

Figure 9:
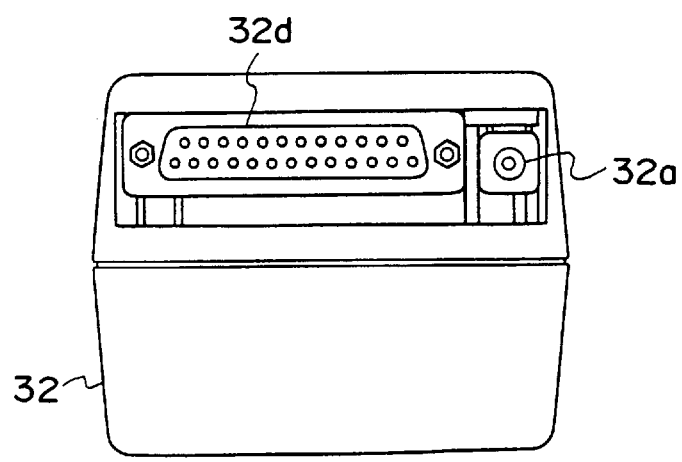
FIG. 9 is a side view which shows the R/W device.

A serial interface 37 is provided in the box 32. Further, a connector 32d is, as shown in FIG. 9, mounted to the box 32. As shown in FIG. 5, when a connector 30b of the personal computer 30 is inserted in the connector 32d, the control circuit 34 and the personal computer 30 are connected via the serial interface 37 so as to allow serial communication between the personal computer 30 and the control circuit 34.

Figure 7:
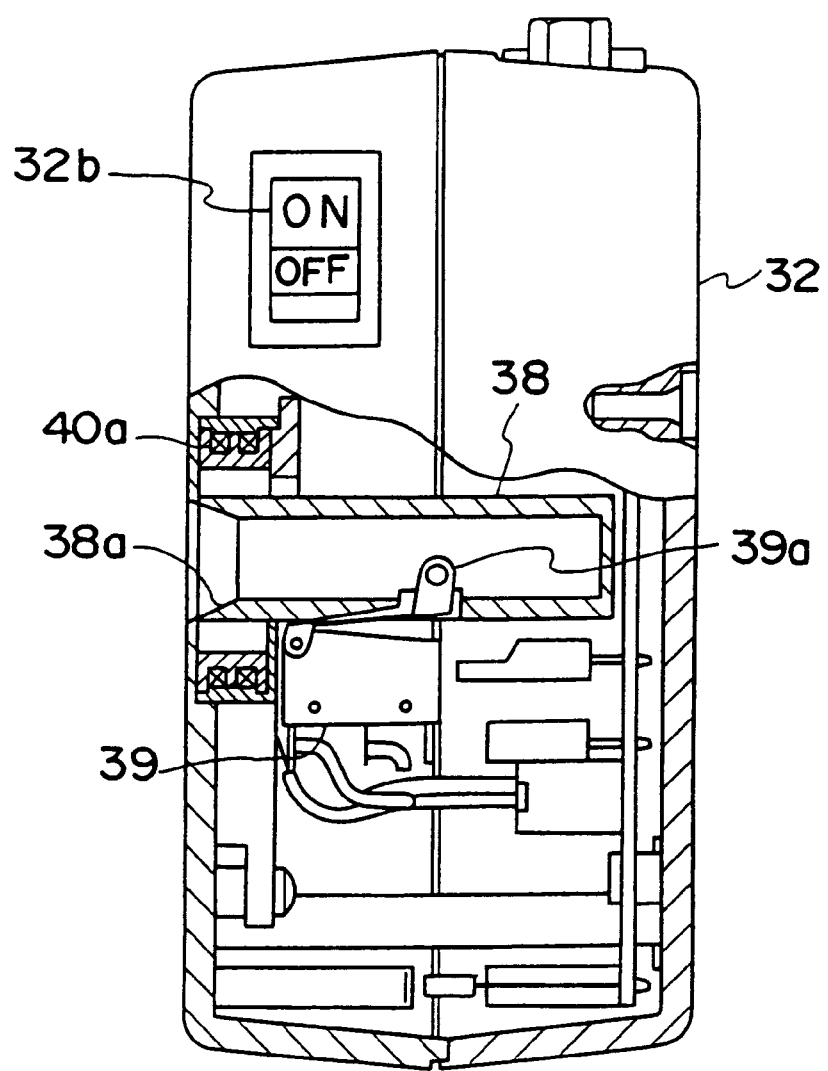
FIG. 7 is a side view which shows the R/W device in a partially broken state.

As shown in FIG. 7, a cylindrical body 38 is provided in the box 32. The cylindrical body 38 has a rectangular cross sectional configuration whose one end surface is open and another end surface is closed. One end surface 38a of the cylindrical body 38 is, as shown in FIG. 8, exposed to the outside by passing through a top plate of the box 32.

A key detection switch 39 is, as shown in FIG. 7, provided in the box 32 and a plunger 39a of the key detection switch 39 is disposed within the cylindrical body 38. When the main body portion 19a of the regular key 19 or the main body portion 19a of the master key 19B is inserted from the one end surface 38a (hereinafter referred to as a key insertion opening 38a) of the cylindrical body 38 into the cylindrical body 38, the plunger 39a is pressed down by the main body portion 19a and the key detection switch 39 is turned on.

An antenna coil 40a is mounted at one end portion of the cylindrical body 38, and when the main body portion 19a of the regular key 19A or the main body portion 19a of the master key 19B is inserted into the key insertion opening 38a, the antenna coil 40a and the key-side antenna coil 21a are connected electromagnetically in a non-contacting state. In FIG. 6, reference numeral 40b designates a resonant capacitor which forms, together with the antenna coil 40a, a resonant circuit 40.

The antenna coil 40a is, as shown in FIG. 6, connected to the control circuit 34 via the power amplifier 41. The control circuit 34 turns the power amplifier 41 on or off based on a command signal transmitted from the personal computer 30 via the serial interface 37, and at the same time, the control circuit 34 transmits a power signal (a carrier signal) whose level decreases with a predetermined timing from the antenna coil 40a to the key-side antenna coil 21a.

This power signal is the same as that supplied from the vehicle-side control circuit 13 to the key-side control circuit 23. As shown in FIG. 14(a), the key-side detection circuit 27 shapes the power signal received via the antenna coil 21a and supplies the same to the control circuit 23. As a result, the control circuit 23 detects inputting of SOM, and at the same time, it starts reading data and determines the contents of a command based on the subsequent power signals. Then, the control circuit 23 turns the transistor 28a of the modulation circuit 28 on or off, and at the same time, transmits a response signal from the antenna coil 21a to the antenna coil 40a at the side of the R/W device.

As shown in FIG. 6, a detection circuit 42 and an amplifier 43 are provided in the box 32. The detection circuit 42 shapes the response signal received by the antenna coil 40a and supplies the same to the control circuit 34 via the amplifier 43. The response signal is the same as that transmitted from the key-side control circuit 23 to the vehicle-side control circuit 13. As shown in FIG. 14(b), after frame synchronization, the control circuit 34 at the side of the R/W device detects inputting of SOM, and at the same time, starts reading the response signal and determines the contents of a response based on the subsequent response signals.

As shown in FIG. 8, a red indicator lens 32d is mounted to the box 32. Further, as shown in FIG. 6, an LED 36b is also provided in the box 32. The control circuit 34 at the side of the R/W device supplies a power source to the LED 36b, and at the same time, lights the indicator lens 32d to indicate communication between the R/W device 31 and the key 19A (or 19B).

Next, functions of the R/W device 31 will be described.
[Read/storage function of operational data]

Figure 15A:
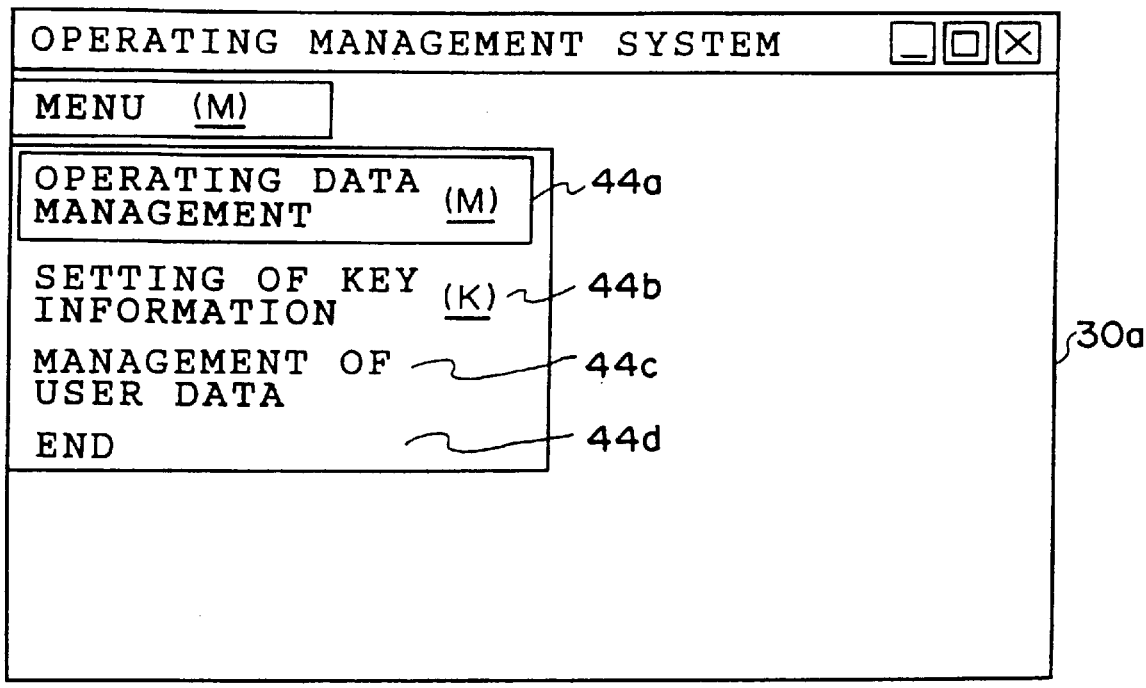
FIG. 15 is diagrams which each show an image surface of a personal computer.
Figure 15B:
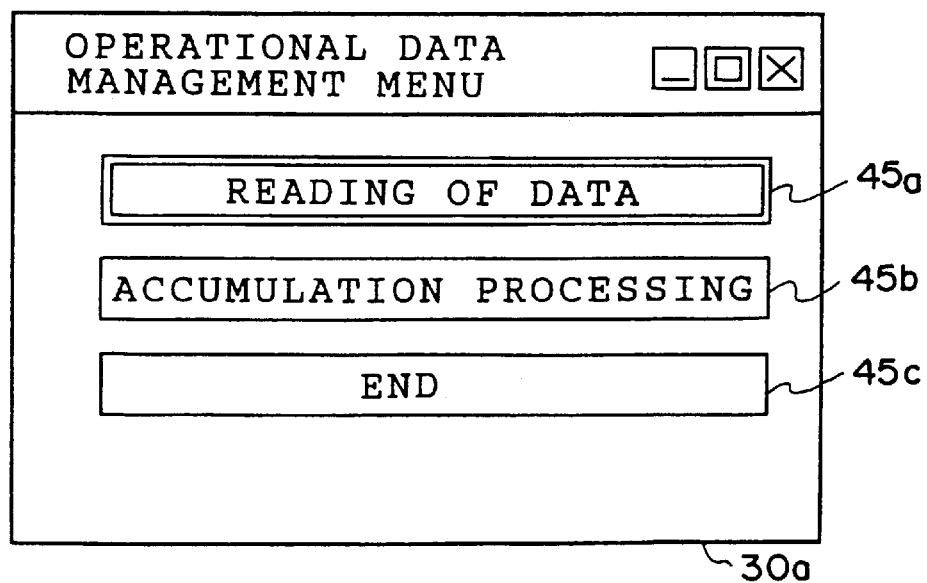

After the power switch 32b of the R/W device 31 is turned on and the main body portion 19a of the regular key 19A is inserted into the key insertion opening 38a, when the personal computer 30 is activated, the personal computer 30 displays, on a display device 30a (see FIG. 5), an operational data management key 44a, a key information setting key 44b, a user data management key 44c, and a termination key 44d, which are shown in FIG. 15(a). Here, when the operational data management key 44a is clicked, as shown in FIG. 15(b), a data reading key 45a, an accumulation processing key 45b, and a termination key 45c are displayed.

When the data reading key 45a is clicked in the above-described state, the personal computer 30 gives a command signal to "detect the presence or absence of a key" to the control circuit 34 at the side of the R/W device. As a result, the control circuit 34 at the side of the R/W device determines, based on an output signal from the key detection switch 39, whether there is a key, and transmits the result of this determination to the personal computer 30.

For example, when it is determined that there is no key, the personal computer 30 displays a message on the display device 30a and requires insertion of the regular key 19A. Further, when it is determined that there is a key, the personal computer 30 transmits a command signal to "read an ID code" to the control circuit 34 at the side of the R/W device.

When the control circuit 34 at the side of the R/W device receives the command signal, the control circuit 34 turns the power amplifier 41 on or off, and simultaneously, transmits a power signal which indicates, "transmit an ID code", from the antenna coil 40a to the key-side control circuit 23 via the key-side antenna coil 21a.

When the key-side control circuit 23 receives the power signal, it is activated and determines the contents of a command of the power signal. Then, when the control circuit 23 determines the command contents indicating, "transmit an ID code", it reads out an ID code from the system area of the nonvolatile memory 26 and turns the transistor 28a of the modulation circuit 28 on or off based on the ID code, and simultaneously, transmits the ID code to the control circuit 34 at the side of the R/W device.

Figure 16A:
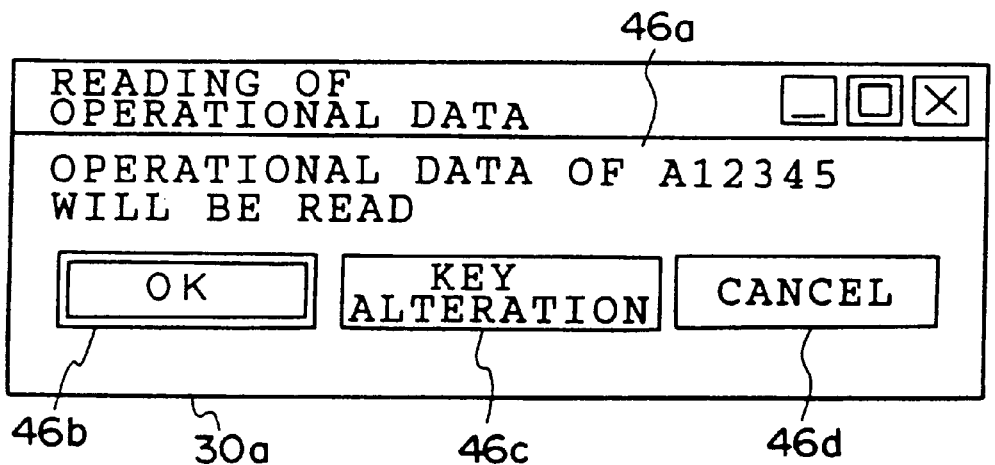
FIG. 16 is diagrams which each show an image surface of the personal computer.

When the control circuit 34 at the side of the R/W device receives the ID code, the control circuit 34 transmits the same to the personal computer 30. As a result, as shown in FIG. 16(a), the personal computer 30 displays a confirmation message 46a which indicates, "operational data of A12345 (ID code) is read", an OK key 46b, a key alteration key 46c, and a cancel key 46d.

Here, when the cancel key 46d is clicked, the personal computer 30 cancels reading of operational data and returns the image surface to a previous state. Further, when the key alteration key 46c is clicked, the personal computer 30 gives a command signal to "read ID code" to the control circuit 34 at the side of the R/W device, repeats the above-described series of operations, and simultaneously, reads an ID code of the key 19A newly inserted into the key insertion opening 38a, and rewrites the confirmation message 46a based on the ID code.

Further, when the OK key 46b is clicked, the personal computer 30 gives a command signal to "read operational data" to the control circuit 34 at the side of the R/W device. As a result, the control circuit 34 at the side of the R/W device gives a power signal which indicates, "transmit operational data", to the key-side control circuit 23.

When the key-side control circuit 23 receives the power signal, the control circuit 23 is activated and determines the contents of a command of the power signal. Then, the control circuit 23 reads operational data from the operational data area of the nonvolatile memory 26, and based on the operational data, turns the transistor 28a of the modulation circuit 28 on or off; simultaneously, the control circuit 23 transmits the operational data to the control circuit 34 at the side of the R/W device. As a result, the control circuit 34 at the side of the R/W device receives the operational data and transfers the same to the personal computer 30.

Figure 16B:
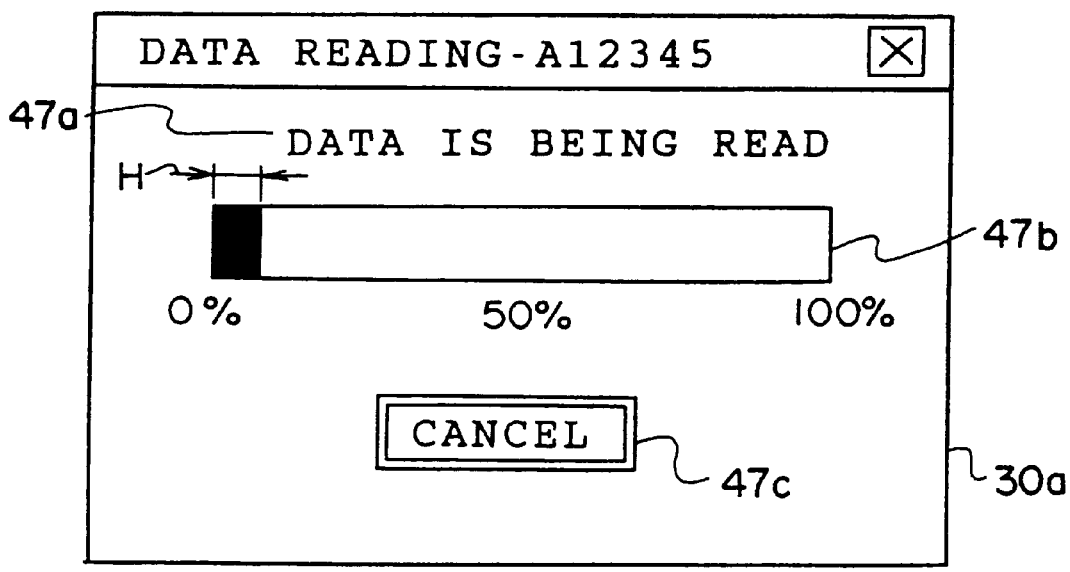

During communication of the operational data between the personal computer 30 and the control circuit 34 at the side of the R/W device, as shown in FIG. 16(b), the personal computer 30 displays a message 47a which indicates, "data is being read", a graph 47b, and a cancel key 47c, and also indicates the percentage of completion of communication by varying a longitudinal dimension H of the graph 47b. Meanwhile, in FIG. 16(b), when the cancel key 47c is clicked, the personal computer 30 stops reading the operational data and returns the image surface to the state shown in FIG. 15(b).

Figure 17:
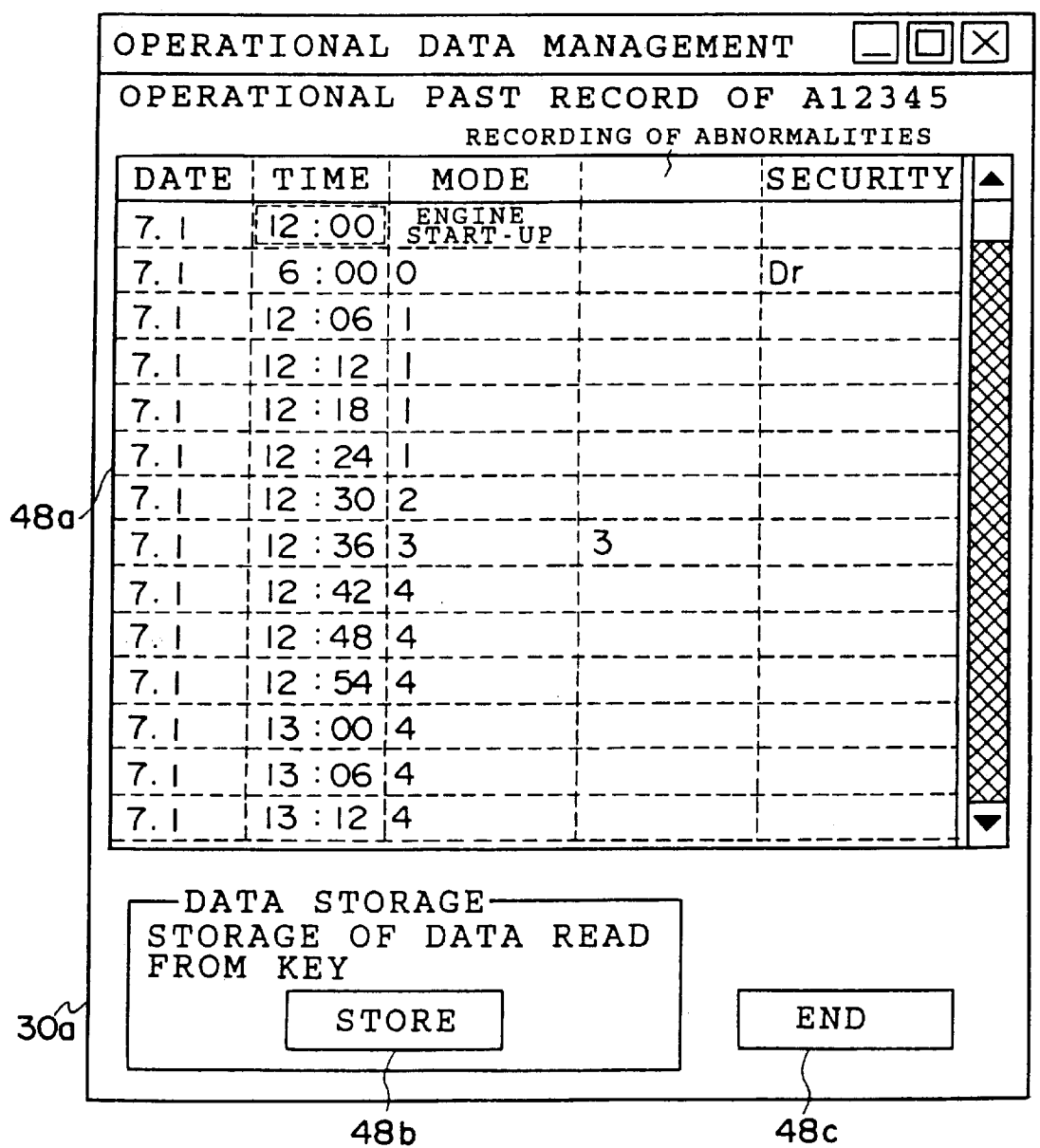
FIG. 17 is a diagram which shows an image surface of the personal computer.

When the communication of the operational data has been completed, as shown in FIG. 17, the personal computer 30 displays operational data 48a, a storage key 48b, and a termination key 48c. Here, when the termination key 48c is clicked, processing ends. The operational data 48a is comprised of the date, time, operating mode, recording of abnormalities, and security, and indicates, "the engine was started at 12:00 on July 1", "an operation of the mode 1 was effected from 12:06 to 12:24 on July 1 (the contents of operation per unit of time)", and the like.

Figure 18A:
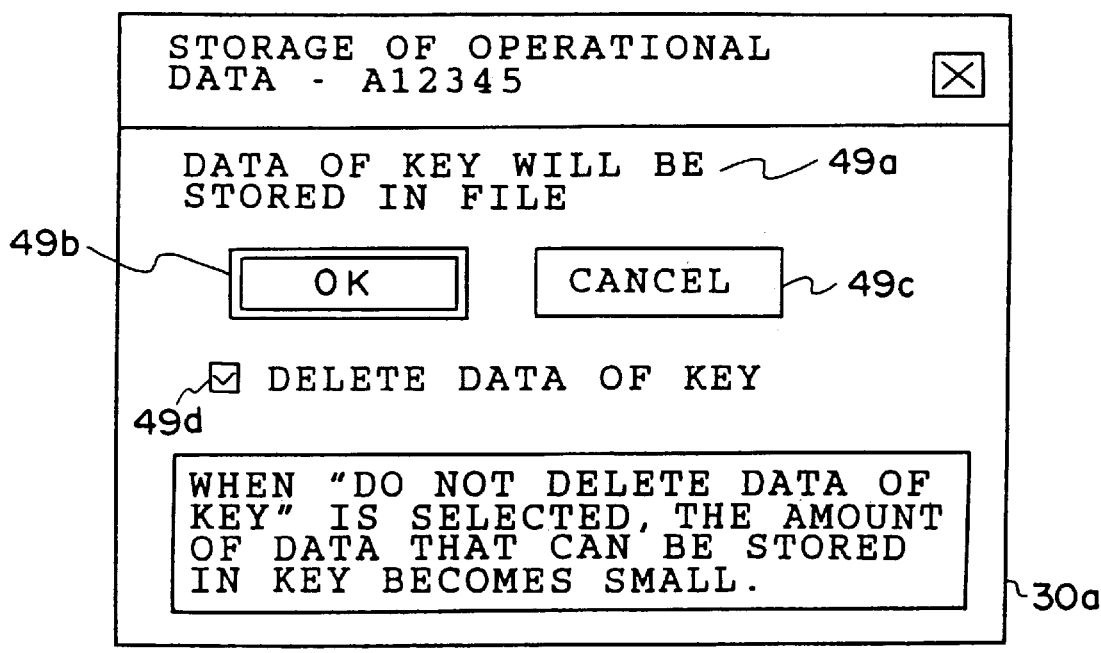
FIG. 18 is diagrams which each show an image surface of the personal computer.

Further, when the storage key 48b is clicked in FIG. 17, the personal computer 30 displays a message 49a which indicates, "data of a key is stored in a file", an OK key 49b, a cancel key 49c, and a check boss 49d, as shown in FIG. 18(a).

Here, when the check boss 49d and the OK key 49b are sequentially clicked, the personal computer 30 writes the operational data 48a in an external storage medium 30c (a floppy disk or a hard disk) shown in FIG. 5 so as to correspond to an ID code. Simultaneously, the personal computer 30 gives a command signal which indicates, "give a command to clear operational data", to the control circuit 34 at the side of the R/W device. As a result, the control circuit 34 at the side of the R/W device gives to the key-side control circuit 23 a command signal to "clear operational data", so that the key-side control circuit 23 clears (initializes) the operational data written in the operational data area of the nonvolatile memory 26.

Further, in FIG. 18(a), when the OK key 49b is directly clicked, the personal computer 30 writes the operational data 48a in the external storage medium 30c without clearing the operational data of the nonvolatile memory 26 at the side of the key. when the cancel key 49c is clicked, the personal computer 30 returns the image surface to a previous state.

Figure 18B:
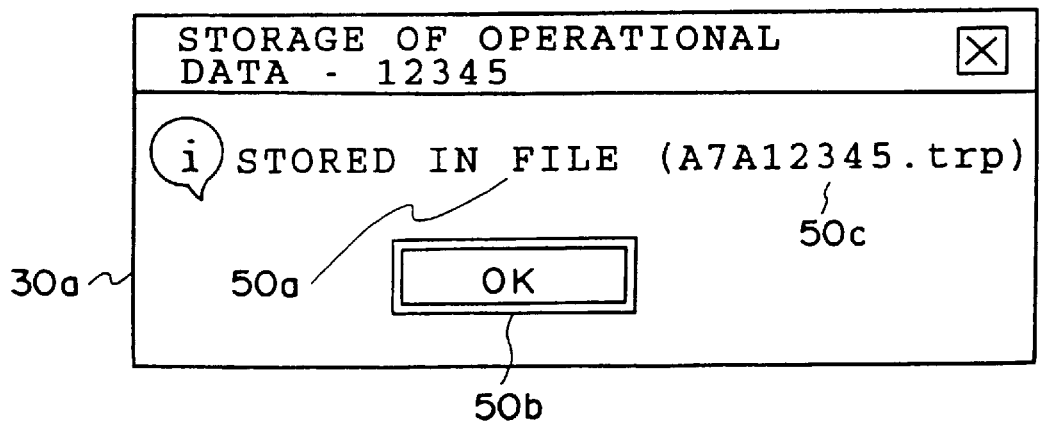

When the operational data 48a is stored in the external storage medium 30c, as shown in FIG. 18(b), the personal computer 30 displays a message 50a which indicates, "data has been stored in a file", an OK key 50b, and a file title 50c. Here, when the OK key 50b is clicked, processing ends. The file title 50c is prepared by the personal computer 30. "A" represents the dominical year (for example, the year 1996, 1997, . . . , 2021 are indicated by A, B, . . . , Z, respectively), "2" represents the month, and "A12345" is an ID code of the key.

[Accumulation processing function of operational data]

Figure 19:
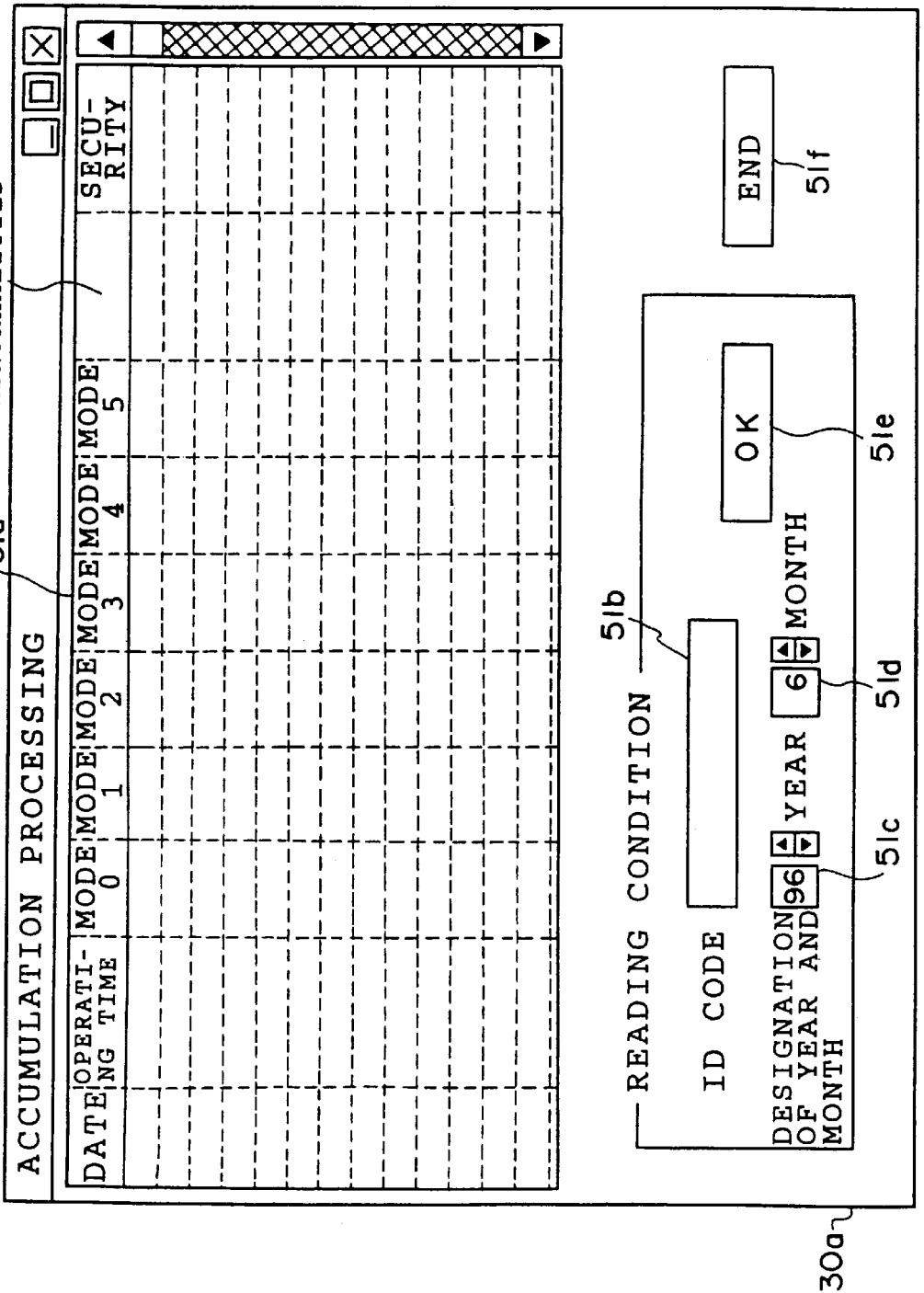
FIG. 19 is a diagram which shows an image surface of the personal computer.

In FIG. 15(b), when the accumulation processing key 45b is clicked, the personal computer 30 displays an accumulation processing list 51a, an ID code input portion 51b, a year input portion 51c, a month input portion 51d, an OK key 51e, and a termination key 51f, which are shown in FIG. 19. Here, when the termination key 51f is clicked, processing ends.

Figure 20:
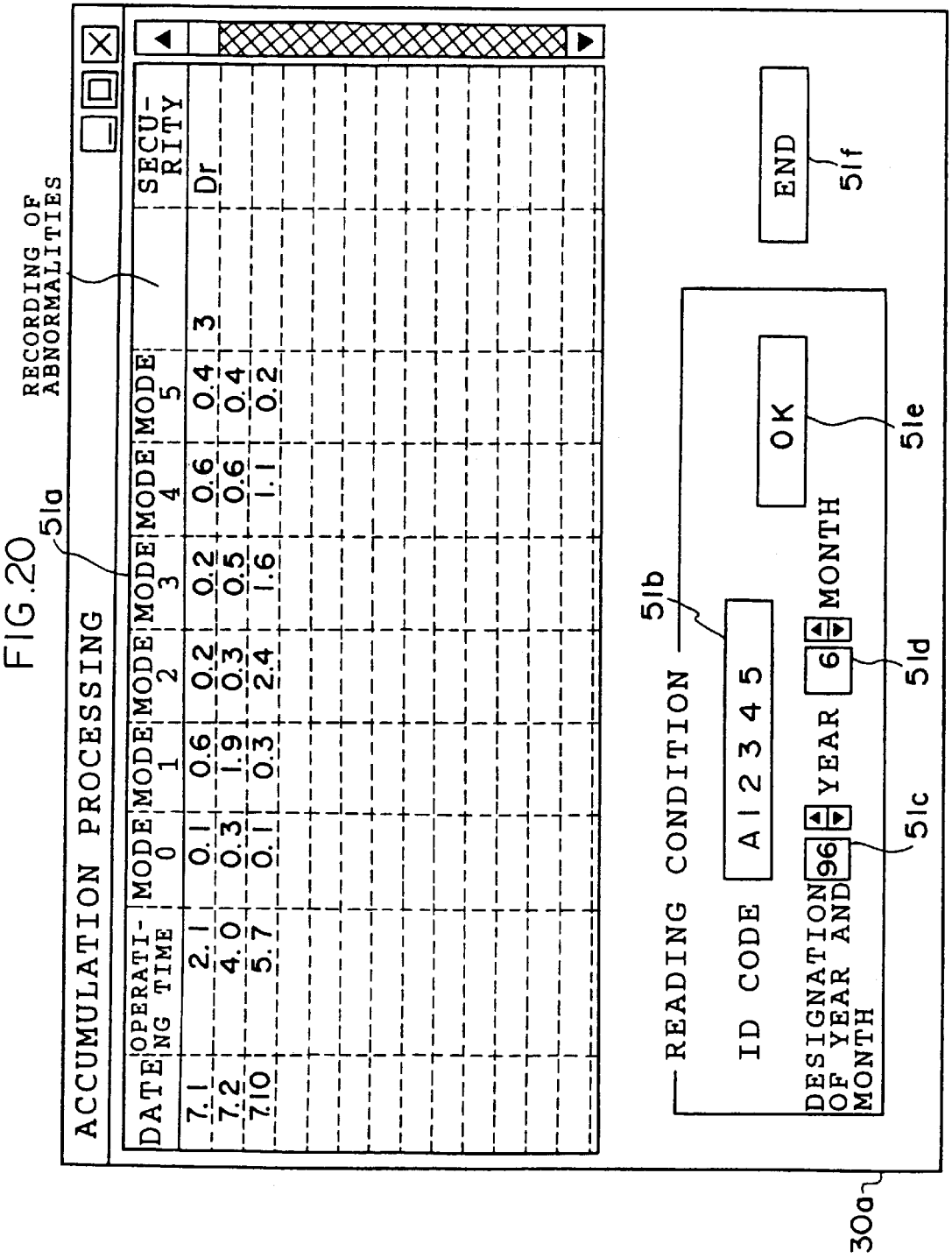
FIG. 20 is a diagram which shows an image surface of the personal computer.

Further, after the ID code, the year, and the month are respectively inputted to the ID code input portion 51b, the year input portion 51c, and the month input portion 51d, when the OK key 51e is clicked, the personal computer 30 reads out the operational data corresponding to the inputted ID code, year, and month from the external storage medium 30c. Then, the personal computer 30 processes the operational data based on an accumulation processing program and accumulates operational data for each key (each ID code), for each month, and for each contents of operation, and as shown in FIG. 20, the personal computer 30 writes a processing result in a predetermined section of the accumulation processing list 51a. Meanwhile, this accumulation processing is executed by the personal computer 30 individually, and the R/W device 31 does not need to be connected thereto.

[Key information reading function]

In FIG. 15(a), when the key information setting key 44b is clicked, the personal computer 30 gives a command signal to "read key information" to the control circuit 34 at the side of the R/W device. As a result, the control circuit 34 at the side of the R/W device transmits a command signal which indicates, "send key information", to the key-side control circuit 23.

Figure 21:
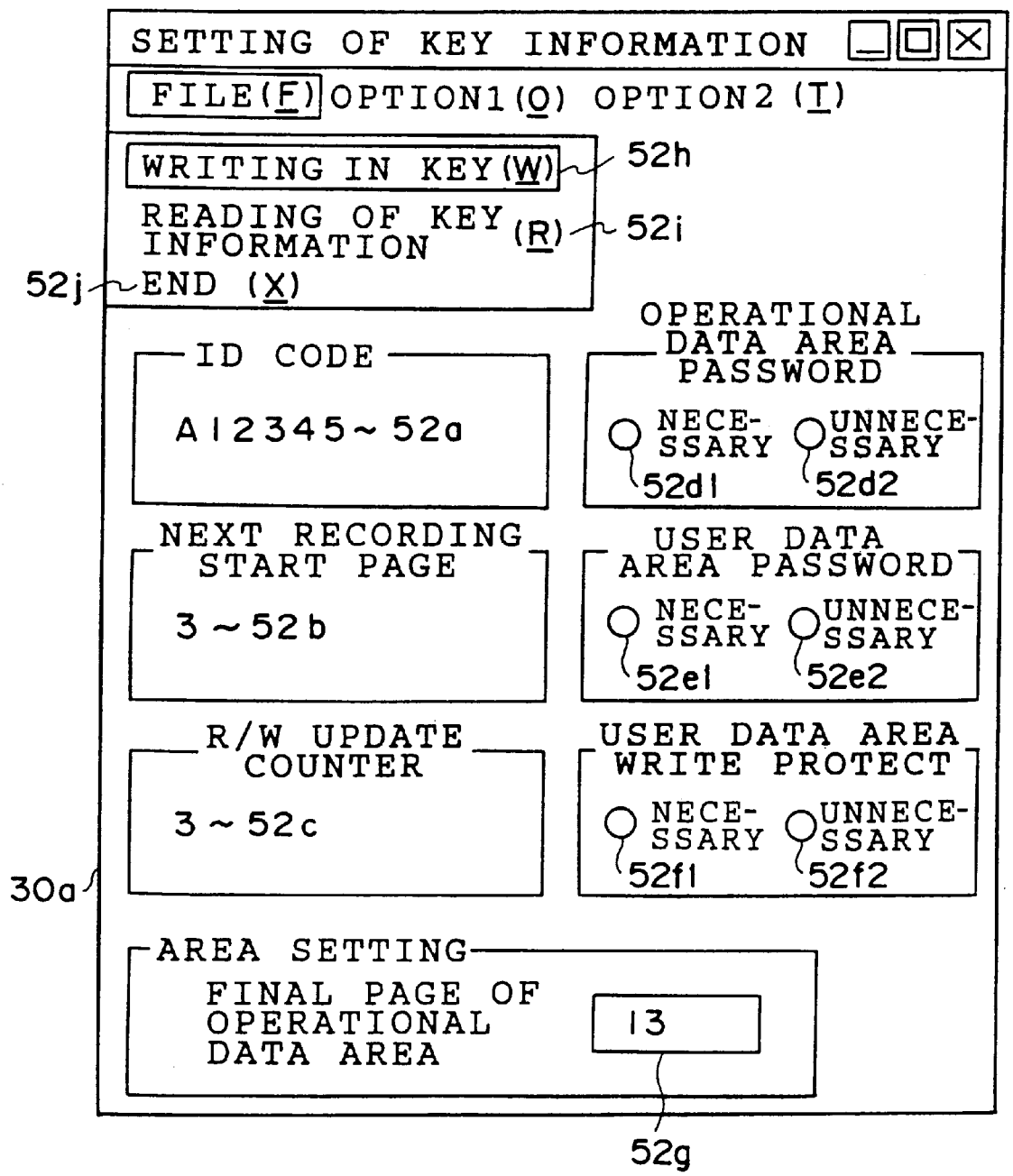
FIG. 21 is a diagram which shows an image surface of the personal computer.

When the key-side control circuit 23 receives the command signal, the control circuit 23 is activated to read out key information from the system area of the nonvolatile memory 26, and also transmits the same to the personal computer 30 via the control circuit 34 at the side of the R/W device. As a result, as shown in FIG. 21, the personal computer 30 displays an ID code 52a as the key information, a next recording start page 52b, and an R/W update counter 52c. Simultaneously, the personal computer 30 displays check bosses 52d1 to 52f2, a final page input portion 52g, a key-writing key 52h, a key information reading key 52i, and a termination key 52j.

The next recording start page indicates a reading start page of operational data for the key-side nonvolatile memory 26. When the next recording start page is page 3, the control circuit 34 at the side of the R/W device is provided to read and write the operational data with page 3 set as the start page. Further, the final page input portion 52g is used to change a boundary between the operational data area and the user data area. In FIG. 11, the boundary is page 13. Further, the R/W update counter shown in FIG. 21 is used to perform addition when operational data is read out from the key 19A and is deleted, and indicates a past history of initialization.

[Key information alteration function 1]

Figure 22:
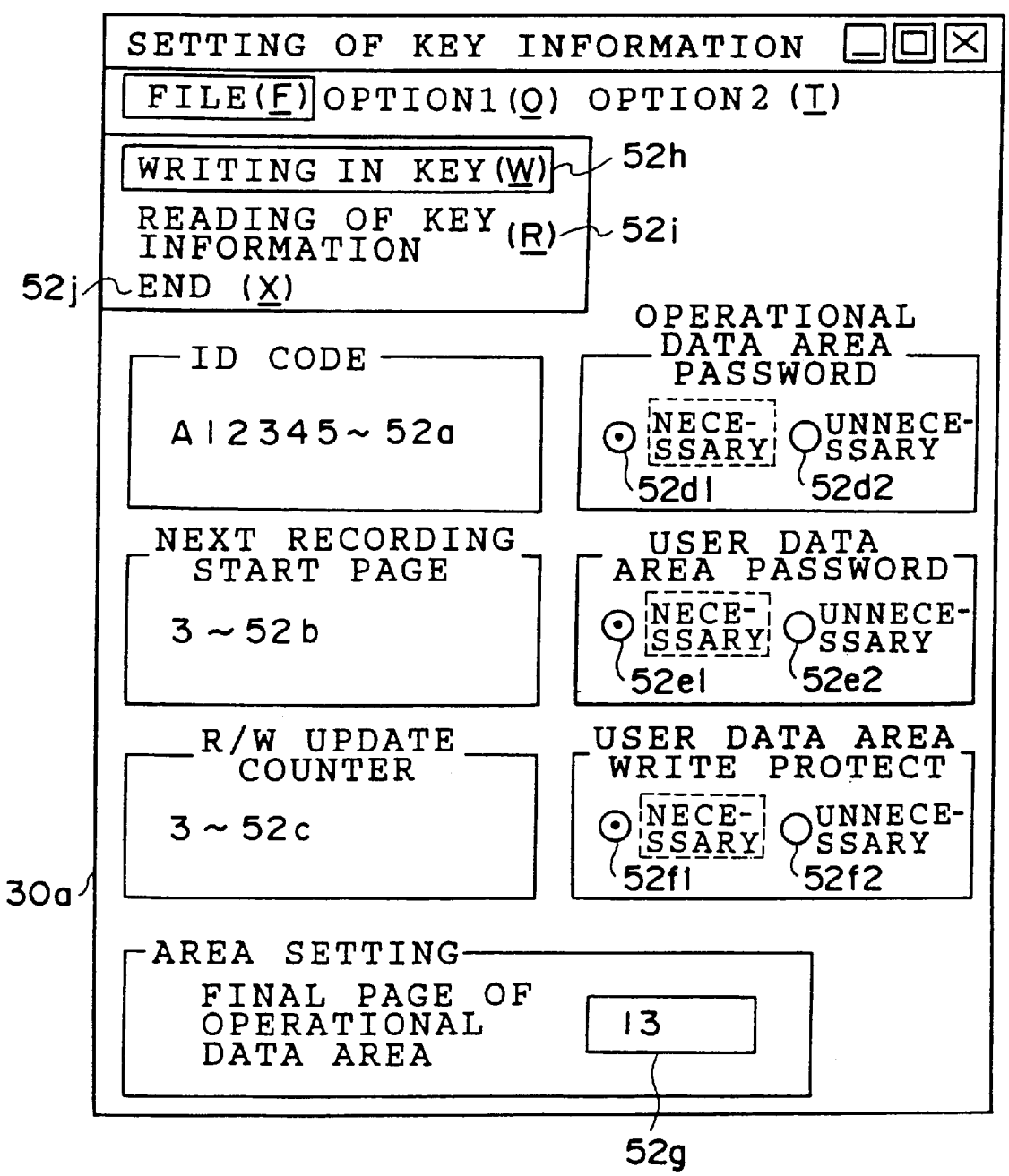
FIG. 22 is a diagram which shows an image surface of the personal computer.

The check bosses 52d1 and 52d2 shown in FIG. 21 are used to select whether a password is used in reading operational data from the operational data area of the nonvolatile memory 26. When the password is used, the check boss 52d1 is clicked, and as shown in FIG. 22, the operational data area password is switched to being necessary, and thereafter, the key-writing key 52h is clicked.

The check bosses 52e1 and 52e2 shown in FIG. 21 are used to select whether a password is used in reading user data from the user data area of the nonvolatile memory 26. When the password is used, the check boss 52e1 is clicked, and as shown in FIG. 22, the user data area password is switched to being necessary, and thereafter, the key-writing key 52h is clicked.

Further, the check bosses 52f1 and 52f2 shown in FIG. 21 are used to select whether the user data area is set in a rewritable state. When the user data area is set in a non-rewritable state, the check boss 52f1 is clicked, and as shown in FIG. 22, the user data area write protect is switched to being necessary, and thereafter, the key-writing key 52h is clicked.

Figure 23A:
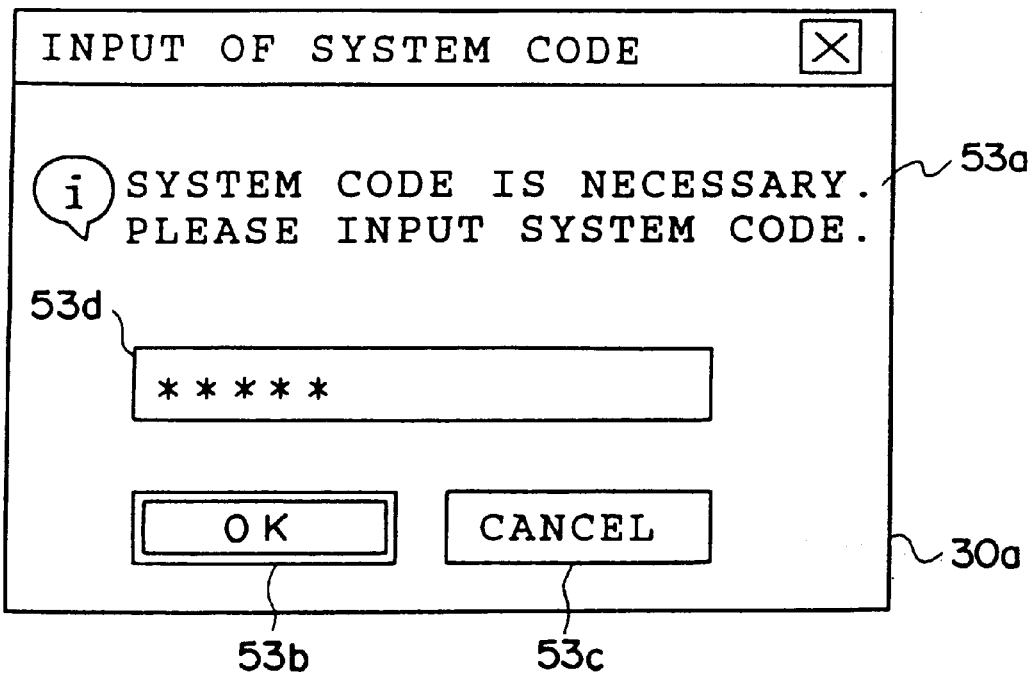
FIG. 23 is diagrams which each show an image surface of the personal computer.

When the key-writing key 52h is clicked, as shown in FIG. 23(a), the personal computer 30 displays a message 53a which indicates, "System code is needed. Input system code.", an OK key 53b, a cancel key 53c, and a system code input portion 53d. Here, when the cancel key 53c is clicked, the image surface is returned to a previous state.

Further, when the OK key 53b is clicked after a system code (six alphanumeric characters or less) has been inputted to the system code input portion 53d, the personal computer 30 gives a command to the key-side control circuit 23 via the control circuit 34 at the side of the R/W device; at the same time, the personal computer 30 switches the operating mode to a mode for reading operational data using a password, a mode for reading user data using a password, or a mode by which rewriting of the user data area is made impossible.

Figure 23B:
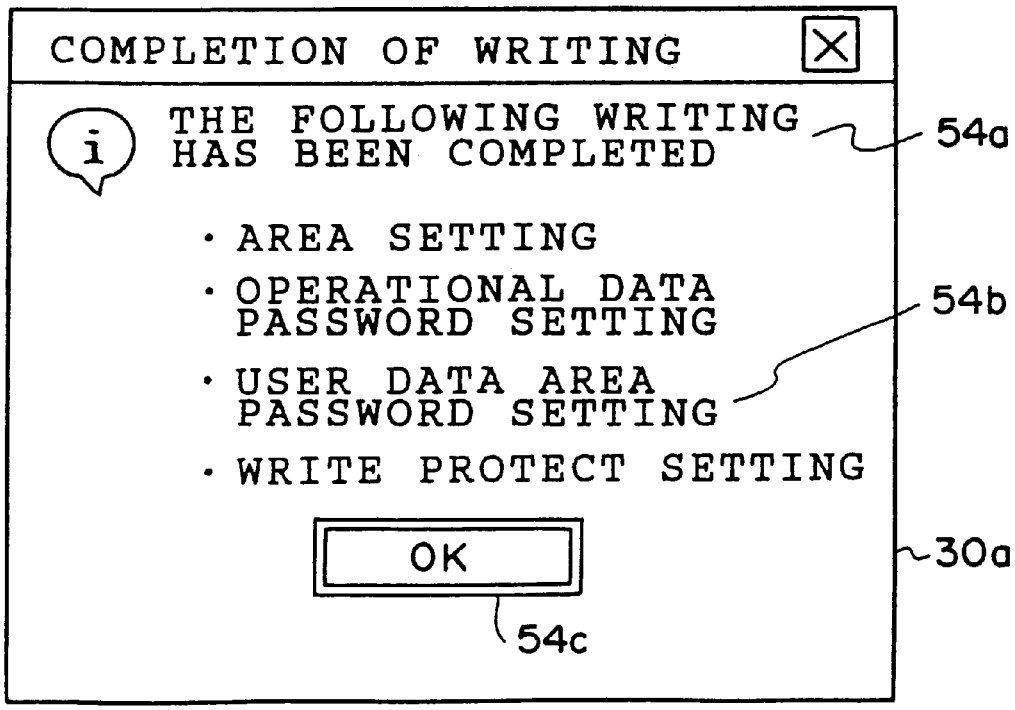

When the mode is switched, as shown in FIG. 23(b), the personal computer 30 displays a message 54a which indicates, "the following writing has been completed", switching contents 54b of modes of "area setting, operational data password setting, user data area password setting, and writing protect setting", and an OK key 54c. Here, when the OK key 54c is clicked, processing ends.

[Key information alteration function 2]

In FIG. 21, after numeric character N (1 to 15) has been inputted into the final page input portion 52g, when the key-writing key 52h is clicked, the personal computer 30 displays the message 53a, the OK key 53b, the cancel key 53c, and the system code input portion 53d, as will be shown in FIG. 23(a).

Here, when the OK key 53b is clicked after a system code has been inputted into the system code input portion 53d, the personal computer 30 gives a command to the key-side control circuit 23 via the control circuit 34 at the side of the R/W device; at the same time, the personal computer 30 sets the input value N on the final page of the operational data area and sets an input value N+1 on the start page of the user data area, and as shown in FIG. 23(b), the personal computer 30 displays the message 54a, the mode switching contents 54b, and the OK key 54c. In FIG. 1, the storage capacity of the operational data area is detected serially by the reason that the size of an operational data area changes as described above.

[Key information alteration function 3]

Figure 24:
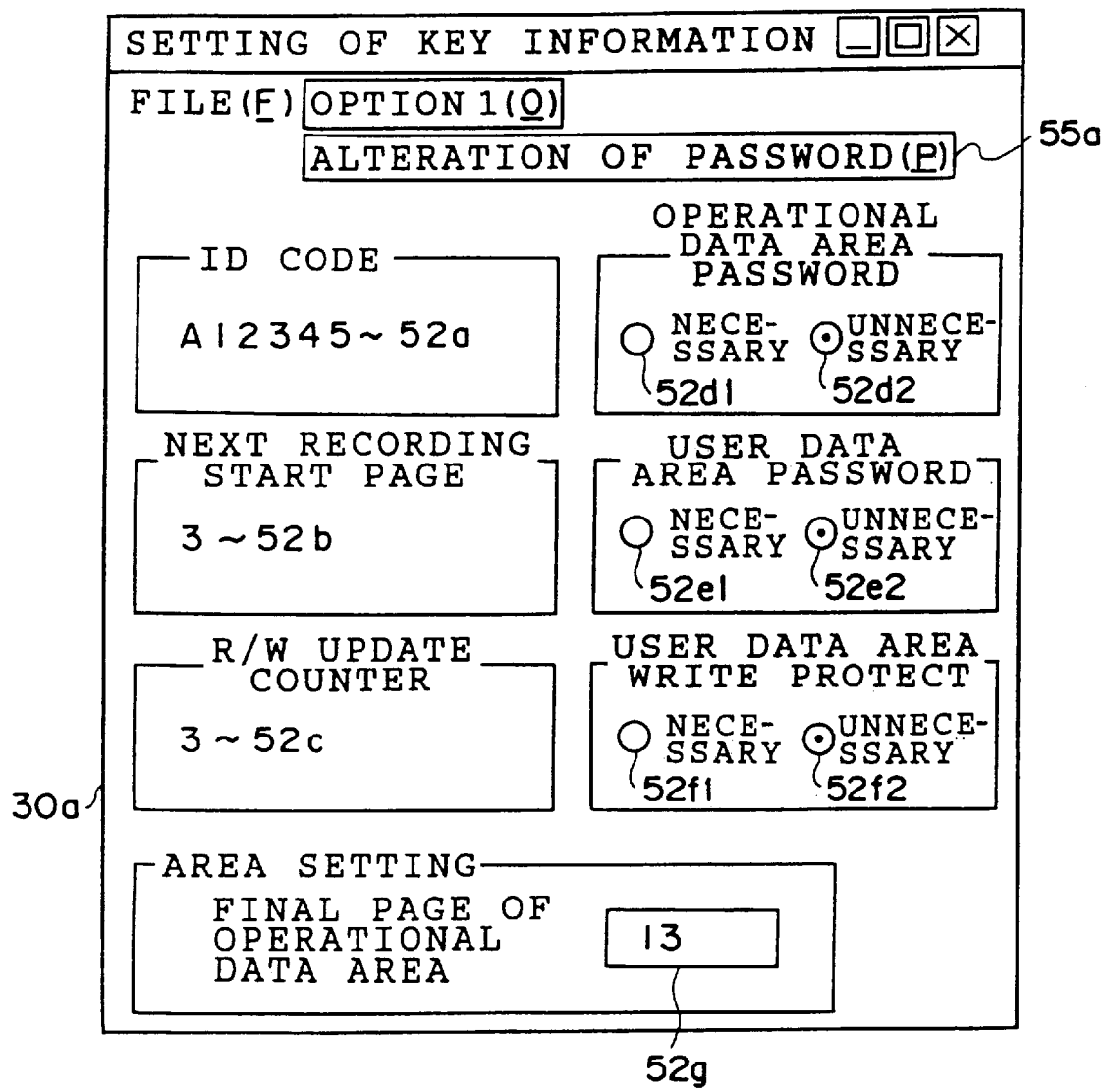
FIG. 24 is a diagram which shows an image surface of the personal computer.
Figure 25:
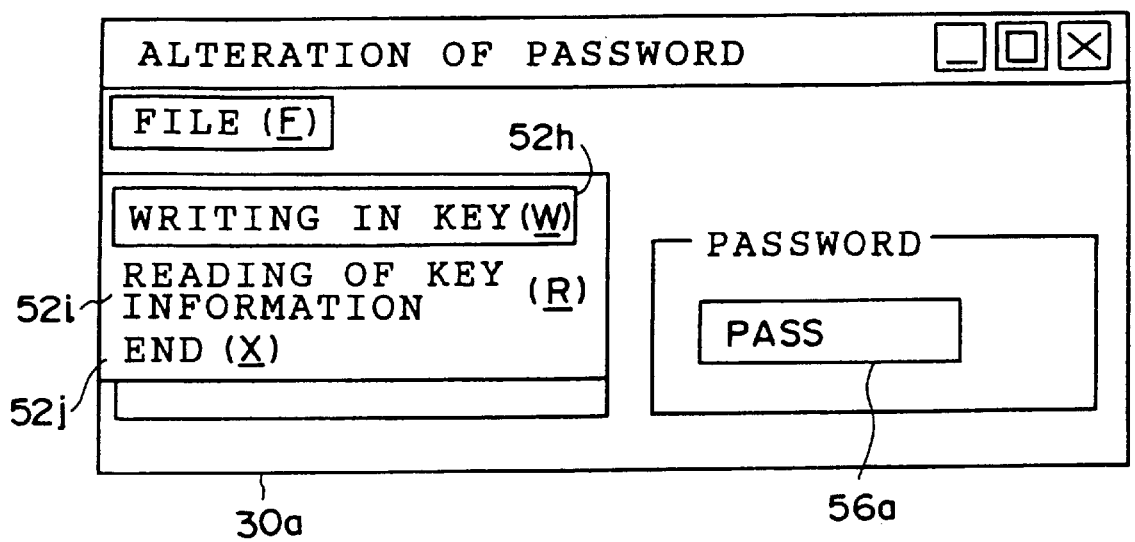
FIG. 25 is a diagram which shows an image surface of the personal computer.

When a password alteration key 55a is clicked in FIG. 24, as shown in FIG. 23(a), the personal computer 30 displays the message 53a, the OK key 53b, the cancel key 53c, and the system code input portion 53d. When the OK key 53b is clicked after a system code has been inputted to the system code input portion 53d, the personal computer 30 displays a password input portion 56a and displays a present password (PASS) in the input portion 56a, as shown in FIG. 25.

In the above-described state, when the key-writing key 52h is clicked after an alteration password has been inputted to the password input portion 56a, as shown in FIG. 23(a), the personal computer 30 displays the message 53a, the OK key 53b, the cancel key 53c, and the system code input portion 53d. Here, when the OK key 53b is clicked after a system code has been inputted to the system code input portion 53d, the personal computer 30 gives a command to the key-side control circuit 23 via the control circuit 34 at the side of the R/W device and also alters the password. Then, as shown in FIG. 23(b), the personal computer 30 displays the message 54a, the mode switching contents 54b, and the OK key 54c.

[Key information alteration function 4]

In FIG. 15(a), when the user data management key 44c is clicked, the personal computer 30 reads out an ID code from the regular key 19A, and also displays the confirmation message 46a (which is, in this case, a message indicating that "user data of A12345 is read"), the OK key 46b, the key alteration key 46c, and the cancel key 46d, as shown in FIG. 16(a). Here, when the OK key 46b is clicked, the personal computer 30 reads out user data from the user data area of the nonvolatile memory 26 of the key-side control circuit 23 via the control circuit 34 at the side of the R/W device, and also displays the same on the image surface.

Meanwhile, when the operating mode is switched to the mode for reading user data using a password, the personal computer 30 displays an image surface for input of the password. Then, when the personal computer 30 detects that the password has been accurately inputted, the personal computer 30 reads out the user data from the nonvolatile memory 26 and displays the same on the image surface.

Here, when user data (corresponding to user information) such as an ID code, an engine number, optional carrying data, maintenance data in a dealer, a past history of fueling, diagnosis data at the time of use, and the like are inputted to the personal computer 30, the personal computer 30 displays the message 53a, the OK key 53b, the cancel key 53c, and the system code input portion 53d, as shown in FIG. 23(a).

Meanwhile, when the operation is switched to the mode by which rewriting of a user data area is made impossible, the personal computer 30 displays a message on the image surface and indicates that user data cannot be written.

In FIG. 23(a), when the OK key 53b is clicked after a system code has been inputted to the system code input portion 53d, the personal computer 30 writes user data in the user data area of the nonvolatile memory 26 via the control circuit 34 at the side of the R/W device or rewrites the user data; thereafter, the personal computer 30 displays the message 54a, the mode switching contents 54b, and the OK key 54c, as shown in FIG. 23(b).

In performing each of the above-described operations, data communication between the personal computer 30, the control circuit 34 at the side of the R/W device, and the key-side control circuit 23 are effected as described below. As shown in FIG. 4(a), when a command signal to "read data (operational data, user data, and the like)" is outputted from the personal computer 30, the control circuit 34 at the side of the R/W device receives the command signal from the personal computer 30 as shown in (d) and turns on or off the power amplifier 41. Simultaneously, as shown in (b), the control circuit 34 outputs to the key-side control circuit 23 a power signal which commands to "read data", and thereafter, it is set in a receiving state.

When the key-side control circuit 23 receives the power signal from the control circuit 34 at the side of the R/W device, as shown in (f), the control circuit 23 is activated to determine the contents of a command of the power signal (receiving state). Then, the key-side control circuit 23 is brought into a transmitting state by determining the contents of a command, and reads out data 1, 2, . . . from the nonvolatile memory 26. Based on the data 1, 2, . . . , the control circuit 23 turns on or off the transistor 28a of the modulation circuit 28, and simultaneously, transmits the data 1, 2, . . . to the control circuit 34 at the side of the R/W device.

When the control circuit 34 at the side of the R/W device receives the data 1, 2, . . . , as shown in (c), after frame synchronization, first, the control circuit 34 detects data 1, CRC1, and EOM based on detection of SOM. Subsequently, as shown in (d), the control circuit 34 at the side of the R/W device detects a communication error of data 1 based on the previously-received CRC1 and data 1 while detecting SOM, data 2, CRC2, and EOM. Then, when data 1 has no error, as shown in (e), the control circuit 34 at the side of the R/W device transmits data 1 to the personal computer 30 while receiving data 2.

Meanwhile, CRC is a kind of error detection code and is short for the Cyclic Redundancy Check. Further, EOM is a kind of code which indicates completion of data and is short for the End Of Message. Further, a transmission bit rate from the key-side control circuit 23 to the control circuit 34 at the side of the R/W device is smaller than a transmission bit rate from the control circuit 34 at the side of the R/W device to the personal computer 30.

The control circuit 34 at the side of the R/W device performs repeatedly an operation for detecting an error of previous data while receiving data and an operation for transmitting previous data to the personal computer 30 while receiving data. Here, as shown in (d), when the control circuit 34 at the side of the R/W device detects an error of data m while receiving data m+1, first, the power amplifier 41 is turned off for a predetermined time, and at the same time, as shown in (b), a stop pulse is outputted. Subsequently, a command to "read from data m" is transmitted.

When the key-side control circuit 23 receives the stop pulse, as shown in (f), the key-side control circuit 23 is switched from the transmitting state to the receiving state. Then, the key-side control circuit 23 determines the contents of a command of a power signal to "read (retransmit) from data m" and transmits data m, data m+1, . . . to the control circuit 34 at the side of the R/W device.

When the control circuit 34 at the side of the R/W device receives data m, data m+1, . . . , as shown in (c), after frame synchronization, first, the control circuit 34 detects data m, CRCm, and EOM based on the detection of SOM. Subsequently, as shown in (d), the control circuit 34 detects an error of data m while receiving SOM, data m+1, CRC m+1, and EOM. When data m has no error, as shown in (e), the control circuit 34 transmits data m to the personal computer 30 while receiving data m+1.

When the control circuit 34 at the side of the R/W device finishes receiving of SOM, data m+1, CRC m+1, and EOM, as shown in (d), the control circuit 34 detects an error of data m+1 while receiving SOM, data m+2, CRC m+2, and EOM. When data m+1 has no error, as shown in (e), the control circuit 34 transmits data m+1 to the personal computer 30. At this time, when the control circuit 34 detects an end mark from data m+1, the control circuit 34 transmits data m+1 to the personal computer 30 and completes the process. Further, output of a power signal to the key-side control circuit 23 is stopped and the process ends.

Figure 4:
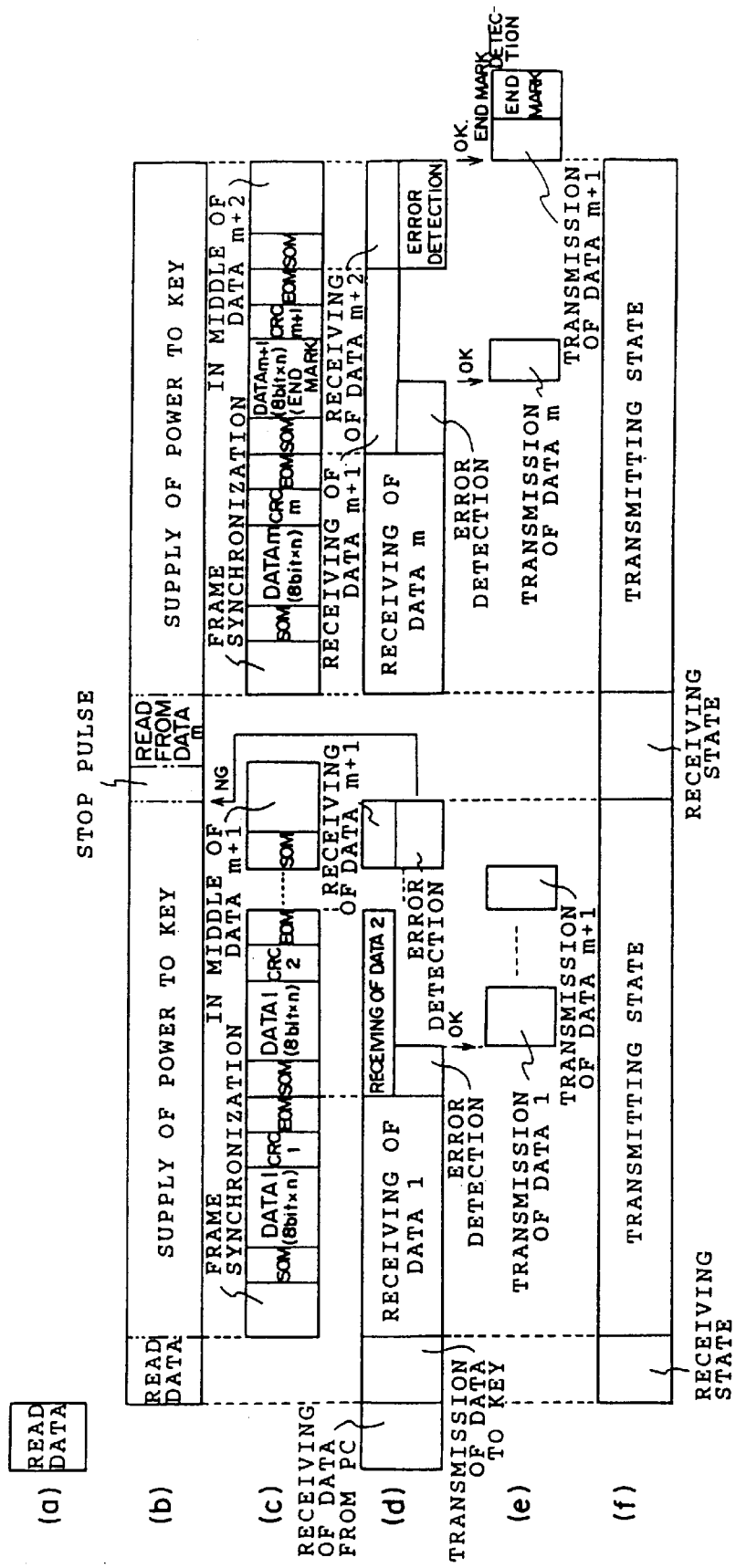
FIG. 4 is a diagram which shows the state of communication of data between a personal computer, an R/W device, and a transponder.

Meanwhile, in FIG. 4, (a) shows contents of a command from the personal computer 30 to the R/W device 31, (b) shows contents of a command from the R/W device 31 to the transponder 20, and (c) shows contents of a command from the transponder 20 to the R/W device 31. Further, (d) and (e) each show the operation of the R/W device 31 and (f) shows the operation of the transponder 20.

Figure 2B:
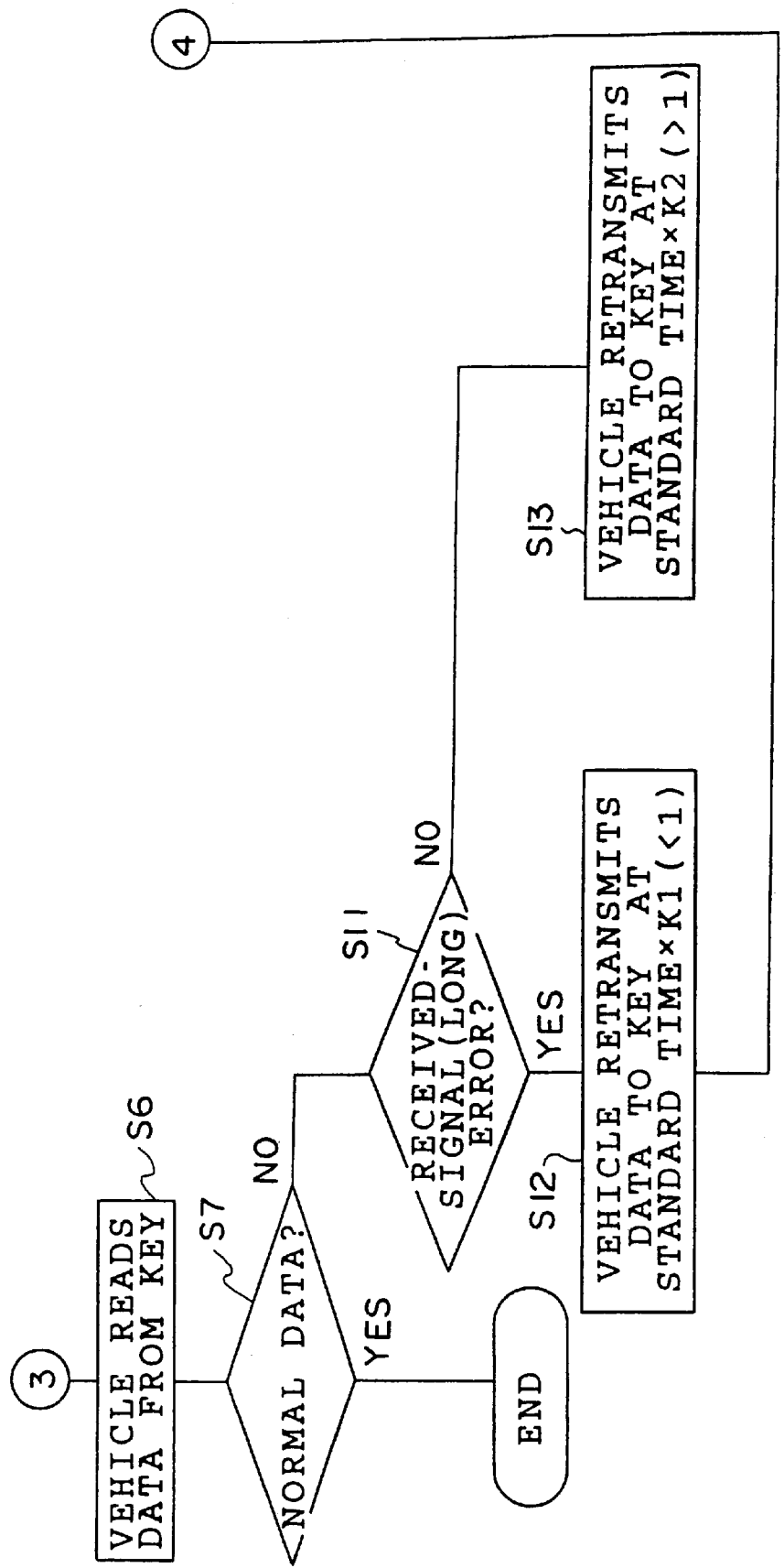

Further, in performing each of the above-described operations, the control circuit 34 at the side of the R/W device and the key-side control circuit 23 each correct the length of data in the same way as in FIG. 2. Namely, when the control circuit 34 at the side of the R/W device receives a command signal from the personal computer 30, the control circuit 34 transmits data to the key-side control circuit 23 at the standard time.

On the other hand, the key-side control circuit 23 measures a data receiving time (data length) based on the clock frequency of its own, and based on this measurement result, the key-side control circuit 23 detects the variation of the clock frequency. Then, when the clock frequency varies, the key-side control circuit 23 transmits to the control circuit 34 at the side of the R/W device a "receiving-time (long) error signal" or "receiving-time (short) error signal". As a result, the control circuit 34 at the side of the R/W device corrects the length of data and retransmits to the key-side control circuit 23.

According to the above-described embodiment, when the storage capacity of the transponder 20 (i.e., the storage capacity of the operational data area) becomes full, the vehicle-side controller 12 writes operational data in the nonvolatile memory 13a of its own, and when the transponder 20 is initialized, the operational data stored in the vehicle-side controller 12 is written in the transponder 20. For this reason, even when the storage capacity of the transponder 20 becomes full, the operational data is stored. Accordingly, in the situation in which it is difficult that the key 19A is initialized in such a manner as to be carried into the office 29 as well, the operational data can reliably be recorded.

Further, the state in which the operational data is written in the vehicle-side controller 12 is notified. For this reason, the state in which the storage capacity of the transponder 20 is in a full state is indirectly notified, and therefore, a driver is required to perform initialization of the key 19A.

Moreover, the state in which the operational data stored in the vehicle-side controller 12 be written in the transponder 20 is notified. For this reason, there are prevented such circumstances that the key 19A is pulled out during writing of the operational data so that the communication between the vehicle-side controller 12 and the transponder 20 is interrupted, and at the same time, the writing of operational data is inadvertently impeded.

Further, the transponder 20 has the function of determining variation of a clock frequency and the vehicle-side controller 12 and the R/W device 31 each have the function of correcting data length. For this reason, it becomes unnecessary that the transponder 20 exclusively has a complex time correction function in which the variation of a clock frequency is determined and the data length is corrected. Accordingly, the performance of communication between the vehicle-side controller 12 and the transponder 20 and between the R/W device 31 and the transponder 20 improves without imposing any functional load on the transponder 20 to the utmost.

In this case, so long as setting is such that SOM (=8To), data 1 (=4To), and data 0 (=To), it is easy to discriminate SOM, data 1, and data 0, and therefore, the communication can be carried out relatively accurately without being influenced by the variation of the clock frequency. However, the time for communication becomes long. On the other hand, in the above-described embodiment, since setting is such that SOM (=4To), data 1 (=2To), and data 0 (=To), there is an advantage in that the time for communication is shortened.

FIG. 3 shows the relationship between the clock frequency of the transponder 20 and the communication enable range. As shown in this figure, communication is allowed only in the (standard) range of allowance (of ±30%) in a conventional system. However, in the present embodiment, communication is allowed even in the ranges which exceed the allowance.

The data length from the vehicle-side controller 12 and the data length from the R/W device 31 are measured, and when the measurement result is not obtained in the standard range, it is determined that the clock frequency varies. For this reason, different from the case in which the operating voltage of the transponder 20 is detected to determine the variation of the clock frequency, it becomes unnecessary to use a voltage sensor, and therefore, the transponder 20 is prevented from being made larger. At the same time, the variation of the clock frequency is measured based on the data length from the vehicle-side controller 12 and the data length from the R/W device 31, and therefore, the variation of the clock frequency can be accurately detected.

When an error of communication from the transponder 20 to the R/W device 31 is determined by the R/W device 31 and no communication error is detected, data from the transponder 20 is transmitted to the personal computer 30. When a communication error is detected, a command to retransmit data is given to the transponder 20. For this reason, there is no possibility that useless data (data having a communication error) is transmitted from the R/W device 31 to the personal computer 30, thereby resulting in the time for communication being shortened.

When it is determined by the R/W device 31 that the data from the transponder 20 is the final operational data and user data and the final operational data and user data are detected, transmission of subsequent data to the personal computer 30 is stopped. For this reason, there is no possibility that useless data (initialization data and the like) is transmitted from the R/W device 31 to the personal computer 30, and therefore, in this point as well, the time for communication can be shortened.

When no communication error is found in the data from the transponder 20, the R/W device 31 concurrently performs the operation for receiving data from the transponder 20 and the operation for transmitting to the personal computer 30 the data previously received from the transponder 20. For this reason, as compared with a case in which after detection of an error in the data received from the transponder 20, data is transmitted to the personal computer 30 in a collective manner, the time for communication is shortened still further.

When a communication error is found in the data from the transponder 20, a command to "retransmit, first, data having an error" is given from the R/W device 31 to the transponder 20. For this reason, transmission starts again serially from the data having a communication error. Accordingly, as compared with the case in which transmission starts again from initial data, the time for communication is shortened still further.

Further, the communication of operational data is performed between the vehicle-side controller 12 and the R/W device 31 with the key 19A serving as a medium. For this reason, it is different from a conventional system in which communication of operational data is performed with an IC card serving as a medium, carrying both the key 19A and the IC card becomes unnecessary, and as a result, convenience for use improves. Particularly, in a case of a special vehicle such as the construction vehicle 11, the inconvenience of carrying both the key 19A and the IC card in a work site can be eliminated, and therefore, the present system is even more advantageous in terms of convenience for use.

Moreover, communication of operational data is performed by using an existing hard structure which allows security (immobilizer and door security). For this reason, writing of operational data resulting from that an engine is started by an unregistered key is prevented, which is advantageous in terms of data security.

The user data is written in the key-side nonvolatile memory 26 via the personal computer 30 and the R/W device 31 or the user data is read out from the nonvolatile memory 26. For this reason, it becomes unnecessary to carry an IC card or a notebook having user data written therein, and therefore, convenience for use is further improved.

Next, a second embodiment of the present invention will be described based on FIG. 26. In addition to the control (see FIG. 1) in which after detection of the state in which the storage capacity at the key side is in a full state, operational data is written in an operational data area owned by the vehicle-side control circuit 13, the vehicle-side control circuit 13 indicates a remaining storage capacity at the key side, as will be described later, and requires initialization for the key-side operational data area.

Figure 26:
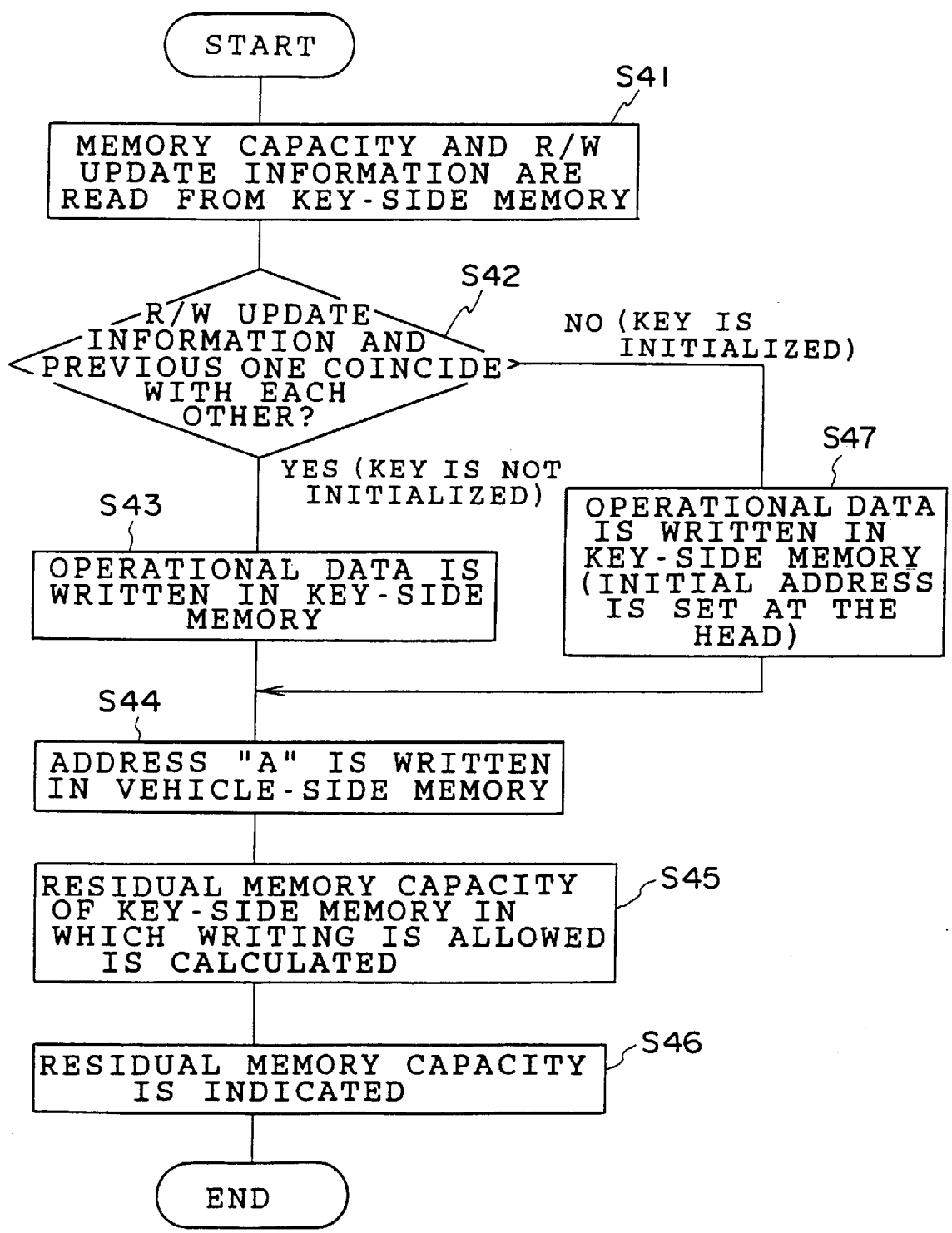
FIG. 26 is a diagram showing a second embodiment of the present invention, which corresponds to FIG. 1.
Figure 27:
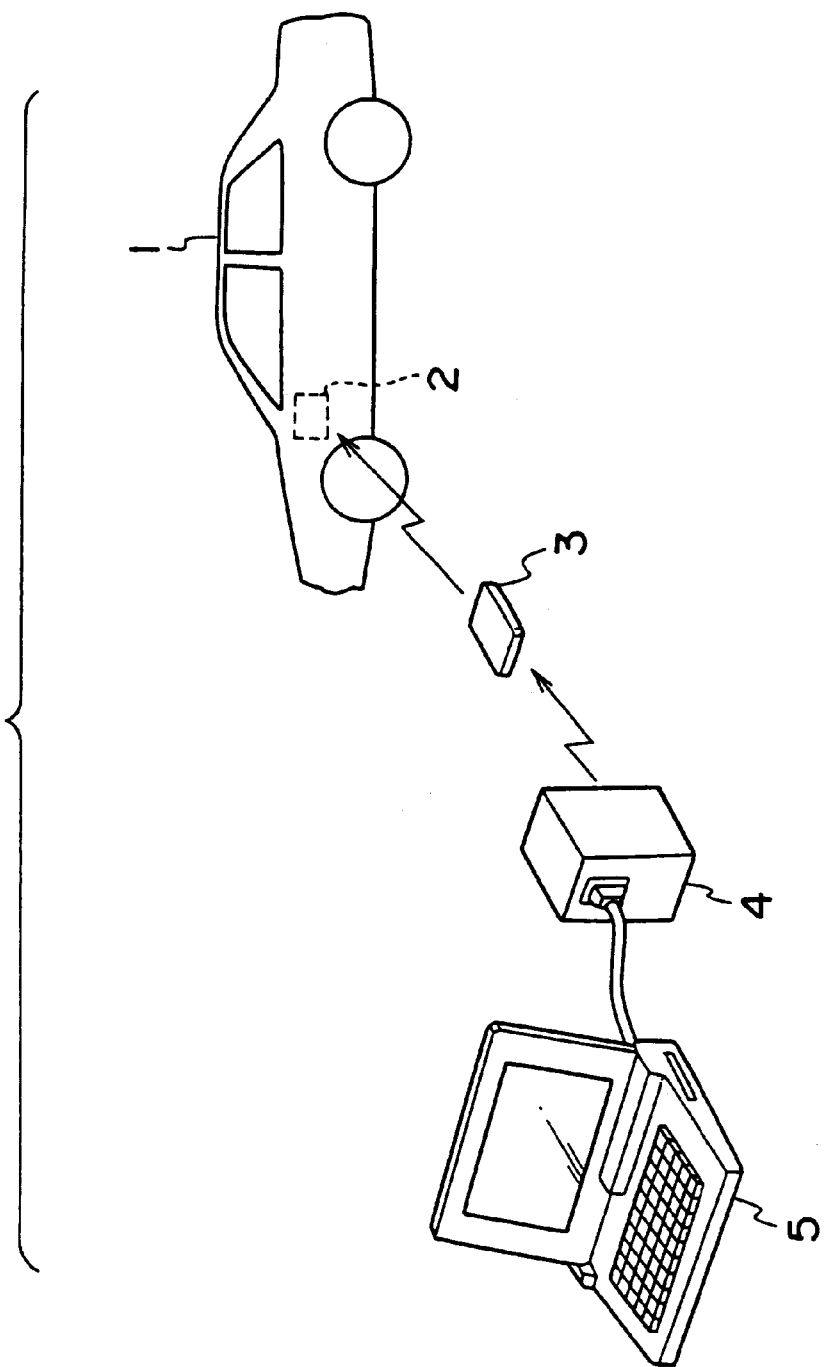
FIG. 27 is a diagram showing a conventional example.

When an engine is started, the process proceeds to step S41 in FIG. 26 and the vehicle-side control circuit 13 reads the storage capacity of the nonvolatile memory 26 (the storage capacity of the operational data area) and the value of the R/W update counter from the key-side control circuit 23. The process proceeds to step S42 in which it is determined whether the value of the R/W update counter and a previously-read value coincide with each other. For example, when the present value of the R/W update counter and the previously-read value coincide with each other, it is determined that the operational data area has not been initialized, and the process proceeds from step S42 to step S43.

When the process proceeds to step S43, the vehicle-side A control circuit 13 writes the operational data in the key-side nonvolatile memory 26 with the key-side writing start address A set at the head, and thereafter, the process proceeds to step S44. Then, the vehicle-side control circuit 13 updates the key-side writing start address A and writes in the memory (RAM) of its own, and thereafter, the process proceeds to step S45.

When the process proceeds to step S45, the vehicle-side control circuit 13 calculates, based on the storage capacity at the side of a key having been detected in step S41 and the writing start address A at the key side, a remaining capacity of the memory in which operation data can be written. Then, the process proceeds to step S46 in which the vehicle-side control circuit 13 controls to drive the LEDs 18$a$1 to 18$e$1, and at the same time, displays the remaining storage capacity at the key side.

In this case, the nonvolatile memory 13$a$ of the vehicle-side control circuit 13 stores reference time Tma, Tmb (<Tma). When the vehicle-side control circuit 13 calculates the remaining storage capacity, first, it converts the remaining storage capacity to remaining time Tm in which data can be written. Subsequently, the remaining time Tm is compared with the reference time Tma, and in the case of "Tm<Tma", the LEDs 18$a$1 to 18$e$1 are turned on and off at a predetermined low interval. Thereafter, in the case of "Tm<Tmb", the LEDs 18$a$1 to 18$e$1 are turned on and off at a predetermined high interval, and at "Tm=0", the LEDs 18$a$1 to 18$e$1 are held in a lighted state.

Further, when the vehicle-side control circuit 13 detects that the present value and the previous value of the R/W update counter do not coincide with each other" in step S42, it is determined that the operational data area has been initialized and the process proceeds from step S42 to step S47. Then, the vehicle-side control circuit 13 writes the operational data in the key-side nonvolatile memory 26 with an initial address set at the head, and thereafter, the process proceeds to step S44.

According to the above-described embodiment, the vehicle-side controller 12 detects the remaining storage capacity of the transponder 20 (the remaining storage capacity of the operational data area) and notifies the detected result. For this reason, the driver can easily perform management in which the key 19A is initialized in a state of being carried into the office 29, and therefore, the operational data can be reliably recorded.

When the remaining storage capacity of the transponder 20 is less than the predetermined value, the detected result of the remaining storage capacity is notified. For this reason, there is prevented such a situation that the driver receives useless information in that the remaining storage capacity is large, so as to induce inadvertent attention.

Further, the lighted state of the LEDs 18$a$1 to 18$e$1 is changed in accordance with the remaining storage capacity of the transponder 20, and therefore, the remaining storage capacity is notified relatively roughly.

Meanwhile, in the above-described second embodiment, the vehicle-side control circuit 13 has both the function of storing the operational data and the function of notifying the remaining storage capacity of the operational data, but the present invention is not limited to the same. For example, the function of storing the operational data may be cancelled.

In the above-described first and second embodiments, in order that the remaining storage capacity of the operational data area be notified, the lighted state of the LEDs 18a1 to 18e1 is changed. However, the present invention is not limited to the same. For example, the lighted state of any one, any two, any three, or any four of the LEDs 18a1 to 18e1 may be changed. Alternatively, with a 7-segment or bar-graph display device being connected to the vehicle-side control circuit 13, the remaining storage capacity may be displayed on the display device in a numeric or graphic manner.

In the above-described first and second embodiments, there is provided a structure in which when the remaining storage capacity Tm of the operational data area is less than the reference values Tma, Tmb, the remaining storage capacity Tm is notified. However, the present invention is not limited to the same and the remaining storage capacity may be constantly notified. In this case, the remaining storage capacity may be notified by the change of the lighted state of the LEDs 18a1 to 18e1 or may be indicated by a 7-segment display or a bar-graph display. Particularly, when the remaining storage capacity is indicated by the 7-segment display or the bar graph display, there is an advantage in that the remaining storage capacity be notified closely and accurately.

In the above-described first and second embodiments, the state in which the vehicle-side controller 12 writes operational data in the nonvolatile memory 13a and the state in which the vehicle-side controller 12 writes the operational data of the nonvolatile memory 13a in the transponder 20 are notified by the lighted state of the LED 18a1, but the present invention is not limited to the same. For example, these states may also be notified by turning on or turning on and off any one, any two, any three, or any four of the LEDs 18a1 to 18e1.

Further, in the above-described first and second embodiments, the state in which the vehicle-side controller 12 writes operational data in the nonvolatile memory 13a and the state in which the vehicle-side controller 12 writes the operational data of the nonvolatile memory 13a in the transponder 20 are notified using light, but the present invention is not limited to the same. For example, these states may also be notified by using a display or using a voice through a speaker. Particularly, in the case of using a display, a 7-segment display, a bar-graph display, or the like may be used.

In the above-described first and second embodiments, the R/W device 31 is driven by an external power source (commercial alternating current power source), but the present invention is not limited to the same. For example, the R/W device 31 may also be driven by an internal power source such as a battery, built in the R/W device 31.

Further, in the above-described first and second embodiments, the desktop personal computer 30 is illustrated as an external controller, but the present invention is not limited to the same. For example, a portable notebook-sized personal computer, subnotebook-sized personal computer, or the like may also be used.

In the above-described embodiments, the digit switch 18g is used for setting the internal clock of the vehicle-side controller 12, but the present invention is not limited to the same. When a clock and a set switch are used, for example, as in general vehicles, a minute of the clock may be set at "0" by operation of the set switch. In this case, with a display portion of the clock being comprised of a 7-segment display device, it suffices that the state in which the vehicle-side controller 12 writes operational data in the nonvolatile memory 13a, the state in which the vehicle-side controller 12 writes the operational data of the nonvolatile memory 13a in the transponder 20, and the remaining storage capacity of the nonvolatile memory 26 may each be displayed in the display device.

In the above-described first and second embodiments, the user data is written in the transponder 20 via the personal computer 30 and the R/W device 31, but the present invention is not limited to the same. For example, a user data writing function may be canceled. In the structure provided above, the R/W device 31 functions as a device exclusively used as a reader for reading operational data from the transponder 20.

In the above-described first and second embodiments, the key detection switch 39 provided in the R/W device 31 is used to detect whether the key 19A or 19B has been inserted in the key insertion opening 38a. However, the present invention is not limited to the same. For example, the key detection switch 39 does not need to be provided. In this case, the R/W device 31 cannot communicate with the transponder 20 even if it tries to communicate therewith. Accordingly, at this point in time, the absence of the key is detected and can be displayed on the image surface of the personal computer 30.

Further, in the above-described first and second embodiments, the transponder 20 is built-in in the key 19A and 19B, but the present invention is not limited to the same. For example, the transponder 20 may be built-in in a card (an IC card may be used as a transmitting/receiving device).

Moreover, in the above-described first and second embodiments, an error of "N–1"-th data is detected while receiving N-th data from the transponder 20, but the present invention is not limited to the same. For example, an error of "N–2"-th data or an error of "N–3"-th data may be detected. In short, it suffices that an error of a previously-received data be detected.

In the above-described first and second embodiments, "N–1"-th data is transmitted to the personal computer 30 while receiving N-th data from the transponder 20, but the present invention is not limited to the same. For example, "N–2"-th data may be transmitted while receiving N-th data. In short, it suffices that previously-received data be transmitted.

In the above-described first and second embodiments, the operation of receiving data from the transponder 20 and the operation of transmitting the data previously received from the transponder 20 to the personal computer 30 are carried out concurrently, but the present invention is not limited to the same. For example, after errors have been detected in all data received from the transponder 20, such data may be collectively transmitted to the personal computer 30.

In the above-described first and second embodiments, there is provided the structure in which a start-up time of an engine and a past history of security are transmitted from the vehicle-side controller 12, but the present invention is not limited to the same. For example, a traveling speed of the vehicle 11, the number of times of braking, an abnormal state of each of various sensor, and the like are detected and may be transmitted as operational data.

In the above-described first and second embodiments, an operational data area is provided in the nonvolatile memory 13a at the side of a vehicle and operational data is written in the operational data area, but the present invention is not limited to the same. For example, a nonvolatile memory exclusively used for writing operational data may be provided.

Further, in the above-described first and second embodiments, the present invention is applied to the construction vehicle 11, but the present invention is not limited to the same. For example, the present invention may also be applied to an automobile. In this case, inputting of a secret identification code is effected in such a manner that the regular key 19A or the master key 19B is inserted in the ignition key cylinder and an operation set including the following operations (1) and (2) is carried out four times (sets). Further, in order to detect an ID code from the key 19A and 19B, the ID code is detected based on the starter switch 11a being turned to ACC and it suffices that a determination about that the ID code has been registered be made. (1) The key 19A or the key 19B is turned N times in the order of, (ACC)→ON→ACC. (2) The key 19A or the key 19B is turned only once in the order of, (ACC)→OFF→ACC.

As clearly seen from the foregoing, the data carrier system of the present invention has the following effects.

According to means described in claim 1, when the storage capacity of a receiving device becomes full, a vehicle-side control device writes operational data in a storage portion of its own, and when the receiving device is initialized, the operational data stored in the vehicle-side control device is written in the receiving device. For this reason, even when the storage capacity of the receiving device becomes full, the operational data is stored. Accordingly, even when the receiving device is initialized in the state of being carried into an office or the like, the operational data can reliably be recorded.

According to means described in claim 2, the state in which operational data is written in a vehicle-side control device is notified. For this reason, the state in which the storage capacity of the receiving device is in a full state is indirectly notified, and therefore, a driver is required to perform initialization for the receiving device.

According to means described in claim 3, the state in which operational data stored in a vehicle-side control device is written in a receiving device is notified. For this reason, there is prevented such a situation that the communication between the vehicle-side control device and the receiving device is interrupted during writing of the operational data and the writing of operational data is thereby impeded inadvertently.

According to means described in claim 4, a vehicle-side control device detects and indicates a remaining storage capacity of a receiving device. For this reason, it is possible for a driver to easily perform management in which the receiving device is initialized in a state of being carried into an office or the like, and therefore, operational data can reliably be recorded.

According to means described in claim 5, when the remaining storage capacity of the receiving device is lower than a predetermined value, a result of detection of the remaining storage capacity is notified. For this reason, there is prevented such a situation that the driver receives useless information in that the remaining storage capacity is large, so as to induce inadvertent attention.

According to means described in claim 6, a lighted state of a light source is changed in accordance with the remaining storage capacity of a receiving device, and therefore, the remaining storage capacity is notified relatively roughly.

According to means described in claim 7, the remaining storage capacity of a receiving device is displayed in a numeric or graphic manner, and therefore, the remaining storage capacity is notified relatively exactly.

What is claimed is:

1. A data carrier system characterized by comprising:
    a vehicle-side control device installed in a vehicle and transmitting operational data of the vehicle; and
    a receiving device for receiving operational data transmitted from the vehicle-side control device,
    wherein the receiving device includes a receiving-device-side storage portion which stores received operational data, and said vehicle-side control device includes:
        a storage capacity detecting portion for detecting the amount of operational data stored in said receiving-device-side storage portion and an initialization detecting portion for detecting that said receiving-device-side storage portion is initialized such that the amount of operational data stored in said receiving-device-side storage portion is zero, and
        a vehicle-side-control-device-side storage portion which stores the operational data, and
        when said storage capacity detecting portion detects that the amount of operational data stored in said receiving-device-side storage portion is in a full state, the vehicle-side control device writes operational data in said vehicle-side-control-device-side storage portion, and
        when said storage capacity detecting portion detects that said receiving-device-side storage portion is initialized, the vehicle-side control device writes the operational data stored in said vehicle-side-control-device-side storage portion in said receiving-device-side storage portion of the receiving device.

2. A data carrier system according to claim 1, characterized in that the vehicle-side control device further includes a notifying portion which indicates that operational data is written in said vehicle-side-control-device-side storage portion of the vehicle-side control device.

3. A data carrier system according to claim 1, characterized in that the vehicle-side control device further includes a notifying portion which indicates that operational data stored in said vehicle-side-control-device-side storage portion is being written in said receiving-device-side storage portion of the receiving device.

4. A data carrier system characterized by comprising:
    a vehicle-side control device installed in a vehicle and transmitting operational data of the vehicle; and
    a receiving device for receiving operational data transmitted from the vehicle-side control device,
    wherein the receiving device includes a storage portion which stores received operational data, and said vehicle-side control device includes:
        a remaining storage capacity detecting portion which detects the remaining storage capacity of said storage portion; and
        a notifying portion which indicates a result of detection of the remaining storage capacity.

5. A data carrier system according to claim 4, characterized in that when the result of detection of the remaining storage capacity is lower than a predetermined value, the vehicle-side control device indicates the result of detection.

6. A data carrier system according to claim 4, characterized in that the notifying portion is comprised of a light source whose lighted state changes in accordance with the remaining storage capacity.

7. A data carrier system according to claim 4, characterized in that the notifying portion is comprised of a display portion which displays the remaining storage capacity in a numeric or graphic display.

8. A data carrier system according to claim 1, characterized in that the receiving device is incorporated in a vehicle key of the vehicle.

9. A data carrier system according to claim 1, characterized by further comprising a reading device which is provided separately from the vehicle and which can initialize said receiving-device-side storage portion and/or can read-out, accumulate and store the operational data stored in said receiving-device-side storage portion.

10. A data carrier system according to claim 8, characterized by further comprising a reading device which is provided separately from the vehicle and which can initialize said receiving-device-side storage portion and/or can read-out, accumulate and store the operational data stored in said receiving-device-side storage portion.

11. A data carrier system according to claim 1, characterized in that said vehicle-side control device further comprises:

a remaining storage capacity detecting portion which detects remaining storage capacity of said receiving-device-side storage portion; and a notifying portion which notifies a result of detection of the remaining storage capacity.

12. A data carrier system according to claim 11, characterized in that when the result of detection of the remaining storage capacity is lower than a predetermined value, the vehicle-side control device indicates the result of detection.

13. A data carrier system according to claim 11, characterized in that the notifying portion is comprised of a light source whose lighted state changes in accordance with the remaining storage capacity.

14. A data carrier system according to claim 11, characterized in that the notifying portion is comprised of a display portion which displays the remaining storage capacity in a numeric or graphic display.

* * * * *